United States Patent
Kobayashi

(10) Patent No.: US 8,803,764 B2
(45) Date of Patent: Aug. 12, 2014

(54) HEAD-MOUNT TYPE DISPLAY DEVICE AND METHOD OF CONTROLLING HEAD-MOUNT TYPE DISPLAY DEVICE

(75) Inventor: Shinichi Kobayashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 269 days.

(21) Appl. No.: 13/418,650

(22) Filed: Mar. 13, 2012

(65) Prior Publication Data

US 2012/0242677 A1    Sep. 27, 2012

(30) Foreign Application Priority Data

Mar. 24, 2011  (JP) .................................. 2011-066382
Nov. 14, 2011  (JP) .................................. 2011-248242

(51) Int. Cl.
*G09G 5/00*   (2006.01)
*G09G 3/00*   (2006.01)
*G09G 3/34*   (2006.01)

(52) U.S. Cl.
CPC ............. *G09G 3/003* (2013.01); *G09G 3/3406* (2013.01)
USPC .................. 345/8; 345/7; 345/102

(58) Field of Classification Search
None
See application file for complete search history.

(56) References Cited

U.S. PATENT DOCUMENTS

| | | | | |
|---|---|---|---|---|
| 5,640,171 | A * | 6/1997 | Shimada | 345/8 |
| 7,307,599 | B2 * | 12/2007 | Tamekuni et al. | 345/8 |
| 8,462,201 | B2 * | 6/2013 | Lin et al. | 348/57 |
| 2012/0200478 | A1 | 8/2012 | Kobayashi | |
| 2012/0206443 | A1 | 8/2012 | Kimura et al. | |
| 2012/0242560 | A1 | 9/2012 | Nakada et al. | |
| 2012/0242570 | A1 | 9/2012 | Kobayashi | |

FOREIGN PATENT DOCUMENTS

JP    A-2009-038759    2/2009

* cited by examiner

*Primary Examiner* — Joseph Haley
(74) *Attorney, Agent, or Firm* — Oliff PLC

(57) ABSTRACT

A head-mount type display device adapted to make a user visually recognize a virtual image includes an image light generation section adapted to generate image light representing an image using image data and then emit the image light, a light guide section adapted to guide the image light, which is emitted, to eyes of the user, a receiving section adapted to receive the image data, and a control section, which is connected to the receiving section, controls image display by the image light generation section, and has a transmitting section adapted to transmit the image data to the receiving section. The control section controls luminance of the image light generation section so as to degrade visibility of the virtual image for a predetermined period of time in a case in which a disturbance in data communication between the transmitting section and the receiving section is presumed.

6 Claims, 19 Drawing Sheets

HEAD-MOUNT TYPE DISPLAY DEVICE AND METHOD OF CONTROLLING HEAD-MOUNT TYPE DISPLAY DEVICE

BACKGROUND

1. Technical Field

The present invention relates to a head-mount type display device as a display device to be mounted on a head, and a method of controlling the head-mount type display device.

2. Related Art

In video display devices, there have been proposed various technologies for reducing the stress applied to the user with switching of the image on the screen in the case in which display of a new picture is started, such as the case in which the state in which no picture is displayed on a liquid crystal panel is switched to the state in which a picture is displayed, or the case in which the input destination of a video signal corresponding to the picture to be displayed on the liquid crystal panel is changed (e.g., JP-A-2009-38759).

Also in a head-mount type display device (a head mount display (HMD)) as a display device to be mounted on the head, there is a case in which display of an image is disturbed due to the display failure or function failure of a device inside the head-mount type display device when, for example, changing the display method of the image (e.g., when changing the display direction, the display size, or the number of colors of the image). Since the head-mount type display device is used while mounted on a human head, and adopts a configuration of making the user visually recognize the image as a virtual image in the visual field area of the user, namely at a position extremely near to the eyes, the disturbance in the image provides significantly uncomfortable feeling to the user.

It should be noted that such a problem is not a problem limited to the case of changing the display method of the image, but is a problem common to the cases in which the disturbance occurs in the data communication inside the head-mount type display device such as a case in which the head-mount type display device is affected by an external noise.

SUMMARY

An advantage of some aspects of the invention is to provide a head-mount type display device capable of reducing the uncomfortable feeling provided to the user when the disturbance in image display occurs due to the disturbance in the data communication inside the head-mount type display device.

APPLICATION EXAMPLE 1

This application example of the invention is directed to a head-mount type display device adapted to make a user visually recognize a virtual image and including an image light generation section adapted to generate image light representing an image using image data and then emit the image light, a light guide section adapted to guide the image light, which is emitted, to eyes of the user, a receiving section adapted to receive the image data, and a control section, which is connected to the receiving section, controls image display by the image light generation section, and has a transmitting section adapted to transmit the image data to the receiving section, wherein the control section controls luminance of the image light generation section so as to degrade visibility of the virtual image for a predetermined period of time in a case in which a disturbance in data communication between the transmitting section and the receiving section is presumed.

By adopting such a configuration, in the head-mount type display device adapted to make the user visually recognize a virtual image, the control section controls luminance of the image light generation section so as to degrade the visibility of the virtual image for a predetermined period of time in the case in which a disturbance in data communication between the transmitting section and the receiving section for performing the communication of the image data is presumed. The disturbance of the data communication between the transmitting sections and the receiving sections leads to the disturbance of the image generated by the image light generation section. Therefore, if the visibility of the virtual image is degraded in the case in which the disturbance of the data communication is presumed, it is possible to realize the configuration with which it is difficult for the user to be aware of the disturbance of the image even in the case in which the disturbance is caused in the image generated by the image light generation section. As a result, it is possible to provide the head-mount type display device capable of reducing the uncomfortable feeling provided to the user when the disturbance in image display occurs due to the disturbance in the data communication inside the head-mount type display device.

APPLICATION EXAMPLE 2

This application example of the invention is directed to the head-mount type display device according to Application Example 1, wherein the control section controls the luminance of the image light generation section so as to degrade the visibility of the virtual image for a predetermined period of time in a case in which a clock rate of the transmitting section is varied in accordance with a variation in a data amount of the image data transmitted between the transmitting section and the receiving section.

By adopting such a configuration, since the control section controls the luminance of the image light generation section so as to degrade the visibility of the virtual image for a predetermined period of time in the case in which the clock rate of the transmitting section is varied in accordance with the change in the data amount of the image data transmitted between the transmitting section and the receiving section, it is possible to realize the configuration with which it is difficult for the user to be aware of the disturbance in the image even in the case in which the disturbance in the image occurs due to the change in the clock rate.

APPLICATION EXAMPLE 3

This application example of the invention is directed to the head-mount type display device according to Application Example 2, wherein the image light generation section further includes a display element adapted to generate the image light from the image data, and the control section varies the data amount of the image data to be transmitted in order to change at least either one of a display direction of the image generated in the display element, a display size of the image, the number of display colors of the image, and the number of frames per unit time of the image.

By adopting such a configuration, the control section can ease the uncomfortable feeling provided to the user in the case in which the image display is disturbed due to the change in at least either one of the display direction of the image generated in the display element, the display size of the image, the number of display colors of the image, and the number of frames per unit time of the image.

APPLICATION EXAMPLE 4

This application example of the invention is directed to the head-mount type display device according to Application Example 2, wherein the image light generation section further includes a display element adapted to generate the image light from the image data, and the control section varies the data amount of the image data to be transmitted in order to make the image generated in the display element occupy only a part of a display area of the display element.

By adopting such a configuration, the control section can ease the uncomfortable feeling provided to the user in the case in which the image display is disturbed due to the arrangement that the image generated in the display element occupies only a part of the display area of the display element.

APPLICATION EXAMPLE 5

This application example of the invention is directed to the head-mount type display device according to any of Application Examples 1 through 4, wherein the control section periodically checks a state of the transmitting section, and controls the luminance of the image light generation section so as to degrade the visibility of the virtual image for a predetermined period of time in a case in which a trouble is detected in the transmitting section as a result of the check.

By adopting such a configuration, the control section can automatically detect the trouble in the transmitting section by periodically checking the state of the transmitting section. Further, since the control section controls the luminance of the image light generation section so as to degrade the visibility of the virtual image for a predetermined period of time in the case of detecting the trouble in the transmitting section, the configuration with which it is difficult for the user to be aware of the disturbance in the image even in the case in which, for example, the disturbance occurs in the image due to the resetting of the transmitting section.

APPLICATION EXAMPLE 6

This application example of the invention is directed to the head-mount type display device according to any of Application Examples 1 through 5, wherein the control section periodically checks presence or absence of a defect in received data received by the receiving section, and controls the luminance of the image light generation section so as to degrade the visibility of the virtual image for a predetermined period of time in a case in which the defect in the received data is detected as a result of the check.

By adopting such a configuration, the control section can automatically detect presence or absence of the defect in the received data received by the receiving section. Further, since the control section controls the luminance of the image light generation section so as to degrade the visibility of the virtual image for a predetermined period of time in the case of detecting the defect in the received data, the configuration with which it is difficult for the user to be aware of the disturbance in the image even in the case in which, for example, the disturbance occurs in the image due to the noise contamination in the received data.

APPLICATION EXAMPLE 7

This application example of the invention is directed to the head-mount type display device according to any of Application Examples 1 through 6, wherein the control section further includes an input interface to which an external device is connected, and the control section controls the luminance of the image light generation section so as to degrade the visibility of the virtual image for a predetermined period of time in a case in which a transfer source of the image data to the control section is switched from a certain external device to another external device.

By adopting such a configuration, since the control section controls the luminance of the image light generation section so as to degrade the visibility of the virtual image for a predetermined period of time in the case in which the transfer source of the image data to the control section is switched from a certain external device to another external device, it is possible to realize the configuration with which it is difficult for the user to be aware of the disturbance in the image even in the case in which the disturbance in the image occurs due to the switching between the image data transfer source devices.

APPLICATION EXAMPLE 8

This application example of the invention is directed to the head-mount type display device according to Application Example 7, wherein the control section further includes a network interface to which an external device to be a transfer source of the image data to the control section is connected.

By adopting such a configuration, since the control section is provided with the network interface to which the external device to be the transfer source of the image data, it is possible to provide the head-mount type display device further compatible with Digital Living Network Alliance (DLNA) in the configuration of the application example 6.

APPLICATION EXAMPLE 9

This application example of the invention is directed to the head-mount type display device according to any of Application Examples 1 through 8, wherein a pair of the image light generation sections and a pair of the light guide sections are provided, and the control section controls the luminance of the pair of the image light generation sections so as to degrade the visibility of the virtual image for a predetermined period of time in a case in which the image data to be transmitted to one of the pair of the image light generation sections and the image data to be transmitted to the other of the pair of the image light generation sections are different from each other.

By adopting such a configuration, since the control section controls the luminance of the pair of image light generation sections so as to degrade the visibility of the virtual image for a predetermined period of time in the case in which the image data transmitted to one of the pair of image light generation sections and the image data transmitted to the other thereof are different from each other, namely in the case in which the display mode for making the user visually recognize the three-dimensional virtual image is set, it is possible to realize the configuration with which it is difficult for the user to be aware of the disturbance in the image even in the case in which the disturbance occurs in the image due to the switching to the three-dimensional display mode.

APPLICATION EXAMPLE 10

This application example of the invention is directed to the head-mount type display device according to any of Application Examples 1 through 9, wherein the predetermined time corresponds to a period in which the control section stops the transmitting section and the receiving section, changes the clock rate in the transmitting section, and then starts up the transmitting section and the receiving section.

By adopting such a configuration, since the control section can degrade the visibility of the virtual image during the period in which the transmitting section and the receiving section are stopped, the clock rate in the transmitting section is changed, and then the transmitting section and the receiving section are started up, the uncomfortable feeling provided to the user can be eased in the case in which the disturbance in the image display due to the disturbance in the data communication occurs.

APPLICATION EXAMPLE 11

This application example of the invention is directed to the head-mount type display device according to any of Application Examples 1 through 10, wherein the control section stops emitting the image light by controlling the luminance of the image light generation section.

By adopting such a configuration, since the emission of the image light is stopped by controlling the luminance of the image light generation section, the visibility of the virtual image can be degraded.

APPLICATION EXAMPLE 12

This application example of the invention is directed to the head-mount type display device according to any of Application Examples 1 through 11, wherein the control section weakens emission of the image light by controlling the luminance of the image light generation section.

By adopting such a configuration, since the emission of the image light is weakened by controlling the luminance of the image light generation section, the visibility of the virtual image can be degraded.

APPLICATION EXAMPLE 13

This application example of the invention is directed to the head-mount type display device according to any of Application Examples 1 through 12, wherein the image light generation section includes a display element adapted to generate the image, and a light source adapted to emit the image light representing the image generated, and the control section controls the luminance of the image light generation section by varying the luminance of the light source in a stepwise manner.

By adopting such a configuration, since the control section controls the luminance of the image light generation section by varying the luminance of the light source in a stepwise manner, the uncomfortable feeling provided to the user can further be eased.

APPLICATION EXAMPLE 14

This application example of the invention is directed to a method of controlling a head-mount type display device adapted to make a user visually recognize a virtual image and including (a) generating image light representing an image using image data received from a receiving section, and then emitting the image light, (b) guiding the image light, which is emitted, to eyes of the user, and (c) transmitting the image data using a transmitting section, and controlling image display in (a) and (b), wherein in (c), luminance of the image light generation section is controlled so as to degrade visibility of the virtual image for a predetermined time in a case in which a disturbance in data communication between the transmitting section and the receiving section is presumed.

By adopting such a configuration, advantages substantially the same as those of the application example 1 can be obtained.

It should be noted that the invention can be realized in various forms, such as a head-mount type display device and a method of controlling a head-mount type display device, a head-mount type display system, a computer program for realizing the method or the functions of the device and the system thereof, or a recording medium or the like storing the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention will hereinafter be explained based on specific examples in the following order.

A. First Embodiment

A-1. Configuration of Head-Mount Type Display Device

Figure 1:
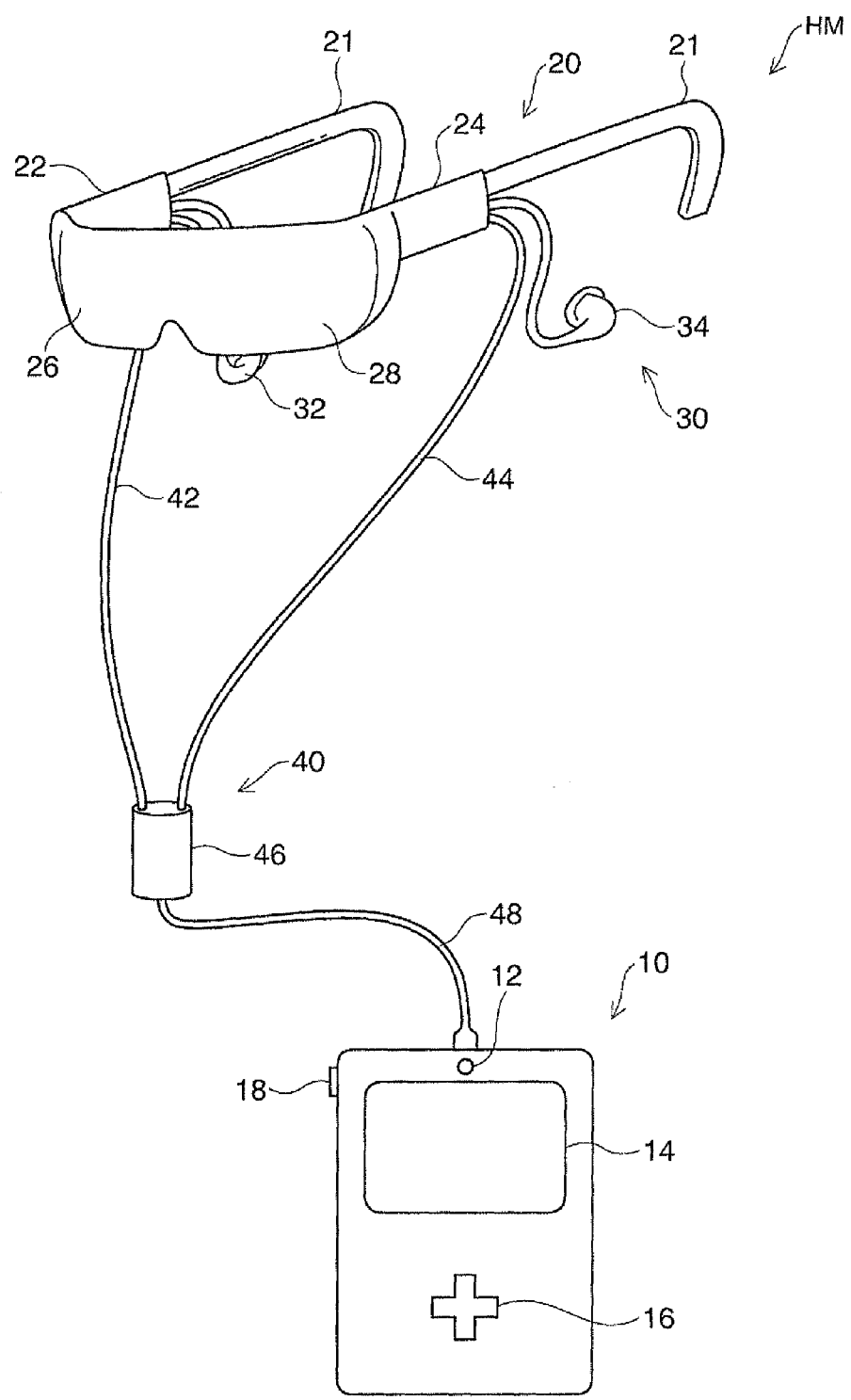
FIG. 1 is an explanatory diagram showing an appearance configuration of a head-mount type display device according to a first embodiment of the invention.

FIG. 1 is an explanatory diagram showing an appearance configuration of a head-mount type display device according to a first embodiment of the invention. The head-mount type display device HM is a display device to be mounted on the head, and is also called a head mount display (HMD). The head mount display HM according to the present embodiment is an optical transmissive head-mount type display device allowing the user to visually recognize a virtual image and at the same time to visually recognize an outside view directly.

The head mount display HM is provided with an image display section 20 for making the user visually recognize the virtual image in the state of being mounted on the head of the user, and a control section (a controller) 10 for controlling the image display section 20.

The image display section 20 is a mounting body to be mounted on the head of the user, and has a shape of spectacles in the present embodiment. The image display section 20 includes ear hook sections 21, a right display drive section 22, a left display drive section 24, a right optical image display section 26, and a left optical display section 28. The ear hook sections 21 are members disposed at the end portions of the right display drive section 22 and the left display drive section 24 so as to traverse above the ears, and function as temples (temples of the spectacles). The right optical image display section 26 and the left optical image display section 28 are disposed so as to be located respectively in front of the right and left eyes of the user in the condition in which the user wears the image display section 20. The right display drive section 22 is disposed at a place where the ear hook section 21 for the right ear and the right optical image display section 26 are connected to each other. Further, the left display drive section 24 is disposed at a place where the ear hook section 21 for the left ear and the left optical image display section 28 are connected to each other. It should be noted that hereinafter the right display drive section 22 and the left display drive section 24 are also collectively referred to simply as a "display drive section," and the right optical image display section 26 and the left optical image display section 28 are also collectively referred to simply as an "optical image display section."

The display drive section includes a drive circuit not shown, a liquid crystal display (LCD), a projection optical system, and so on. The details thereof will be described later. The optical image display section includes a light guide plate not shown and a light control plate. The light guide plate is formed from a light transmissive resin material or the like, and emits the image light taken from the display drive section toward the eyes of the user. The light control plate is a thin-plate like optical element, and is disposed so as to cover the obverse side (the side opposite to the side of the eyes of the user) of the head mount display HM. The light control plate protects the light guide plate to thereby prevent damage of the light guide plate, adhesion of dirt, and so on, and at the same time, by controlling the light transmission of the light control plate, it is possible to control an amount of outside light entering the eyes of the user and the condition of visually recognizing the virtual image. It should be noted that the light control plate can be omitted.

The image display section 20 is further provided with a right earphone 32 for the right ear and a left earphone 34 for the left ear. The right earphone 32 and the left earphone 34 are mounted respectively to the right and left ears when the user wears the image display section 20.

The image display section 20 is further provided with a connection section 40 for connecting the image display section 20 to the control section 10. The connection section 40 includes a main body wire 48 to be connected to the control section 10, a right wire 42 and a left wire 44 branched from the main body wire 48, and a connecting member 46 disposed at the branch point. The right wire 42 is connected to the right display drive section 22, and the left wire 44 is connected to the left display drive section 24. The image display section 20 and the control section 10 perform transmission of various signals via the connection section 40. An end portion of the main body wire 48 on the side opposite to the connection member 46 and the control section 10 are provided with respective connectors (not shown) connected to each other, and the control section 10 and the image display section 20 are connected to each other or separated from each other in accordance with engagement/disengagement of the connector of the main body wire 48 and the connector of the control section 10. As the right wire 42, the left wire 44, and the main body wire 48, there is adopted, for example, a metal cable or an optical fiber.

The control section 10 is a device for operating the head mount display HM. The control section 10 includes a lighting section 12, a touch pad 14, arrow keys 16, and a power switch 18. The lighting section 12 gives notice of the operating state (e.g., ON/OFF of the power) of the head mount display HM with a light emitting state thereof. As the lighting section 12, there can be used, for example, a light emitting diode (LED). The touch pad 14 detects the finger operation of the user on the operation surface of the touch pad 14, and then outputs a signal corresponding to the detection content. The arrow keys 16 detect the holding-down operation to the keys corresponding to up, down, right, and left directions, and then output a signal corresponding to the detection content. The power switch 18 detects the sliding operation of the switch to thereby switch the powering state of the head mount display HM.

Figure 2:
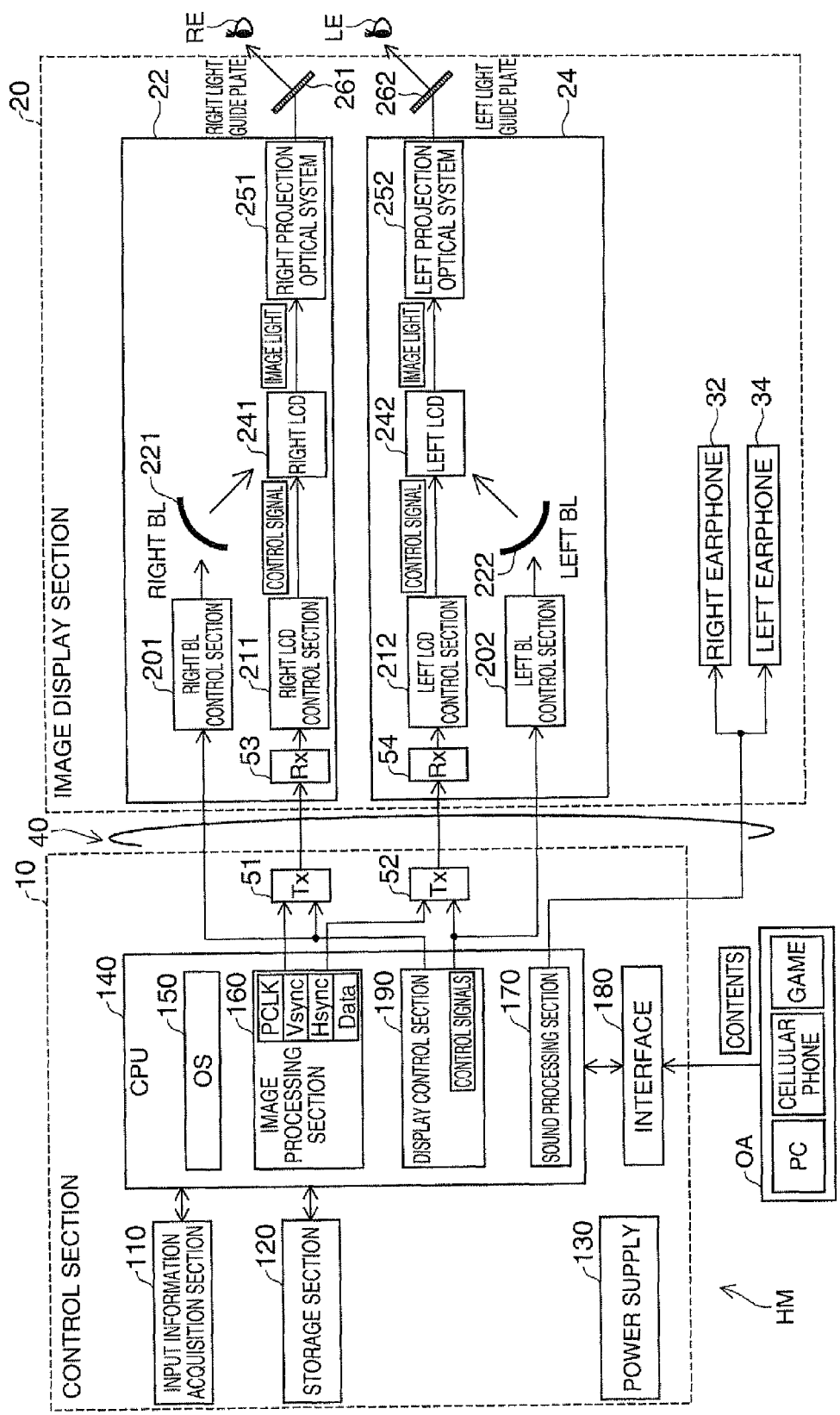
FIG. 2 is a block diagram functionally showing a configuration of the head mount display.

FIG. 2 is a block diagram functionally showing a configuration of the head mount display HM. The control section 10 is provided with an input information acquisition section 110, a storage section 120, a power supply 130, a CPU 140, an interface 180, and transmitting sections (Tx) 51 and 52, and these components are connected to each other via a bus not shown.

The input information acquisition section 110 has a function of acquiring the signal (e.g., the operation input to the touch pad 14, the arrow keys 16, and the power switch 18) corresponding to the operation input by the user. The storage section 120 is a storage section including a ROM, a RAM, a DRAM, a hard disk, and so on. The power supply 130 supplies each section of the head mount display HM with electrical power. As the power supply 130, a secondary battery, for example, can be used.

The CPU 140 performs a program installed in advance to thereby provide a function as an operating system (OS) 150. Further, the CPU 140 develops firmware and a computer program, which are stored in the ROM or the hard disk, in the RAM and then executes them to thereby also function as an image processing section 160, a sound processing section 170, and a display control section 190. The details thereof will be described later.

The interface 180 is an interface for connecting various external equipment OA (e.g., a personal computer PC, a cellular phone terminal, and a game terminal) to be a supply source of contents to the control section 10. As the interface 180, there can be provided with, for example, a USB interface, a micro USB interface, an interface for a memory card, a wireless LAN interface. Further, the contents denote information contents composed of images (still images, moving images), sounds, and so on.

The image processing section 160 generates a clock signal POLK, a vertical sync signal VSync, a horizontal sync signal HSync, and image data Data based on the content input via the interface 180, and then supplies the image display section 20 with these signals via the connection section 40. Specifically, the image processing section 160 acquires the image signal included in the content. In the case of, for example, a moving image, the image signal thus acquired is an analog signal generally composed of 30 frames per second. The image processing section 160 separates sync signals such as the vertical sync signal VSync and the horizontal sync signal HSync from the image signal thus acquired. Further, the image processing section 160 generates the clock signal POLK using a phase locked loop (PLL) circuit or the like not shown in accordance with the period of the vertical sync signal VSync and the horizontal sync signal HSync thus separated.

The image processing section 160 converts the analog image signal from which the sync signals are separated into a digital image signal using an A/D conversion circuit or the like not shown. After then, the image processing section 160 stores the digital image signal thus converted into frame by frame into the DRAM in the storage section 120 as the image data Data (ROB data) of the object image. It should be noted that it is also possible for the image processing section 160 to perform image processing such as a resolution conversion process, various color correction processes of, for example, adjustment of luminance and chromaticness, or a keystone correction process on the image data if necessary.

The image processing section 160 transmits the clock signal POLK, the vertical sync signal VSync, the horizontal sync signal HSync thus generated, and the image data Data stored in the DRAM in the storage section 120 via each of the transmitting sections 51 and 52. It should be noted that the image data Data transmitted via the transmitting section 51 is also referred to as "right eye image data," and the image data Data transmitted via the transmitting section 52 is also referred to as "left eye image data." The transmitting sections 51, 52 function as transmitters for serial transmission between the control section 10 and the image display section 20.

The display control section 190 generates control signals for controlling the right display drive section 22 and the left display drive section 24. Specifically, the display control section 190 controls ON/OFF of driving of a right LCD 241 by a right LCD control section 211, ON/OFF of driving of a right backlight 221 by a right backlight control section 201, ON/OFF of a left LCD 242 by a left LCD control section 212, ON/OFF of driving of a left backlight 222 by a left backlight control section 202, and so on individually using the control signals to thereby control generation and emission of the image light by each of the right display drive section 22 and the left display drive section 24. For example, the display control section 190 makes both of the right display drive section 22 and the left display drive section 24 generate image light, makes either of them generate the image light, or inhibits the both from generating the image light.

The display control section 190 transmits the control signals to the right LCD control section 211 and the left LCD control section 212 via the transmitting sections 51, 52, respectively. Further, the display control section 190 transmits the control signals to the right backlight control section 201 and the left backlight control section 202, respectively.

The sound processing section 170 acquires a sound signal included in the content, amplifies the sound signal thus acquired, and then supplies it to the right earphone 32 and the left earphone 34 of the image display section 20 via the connection section 40.

The image display section 20 is provided with the right display drive section 22, the left display drive section 24, a right light guide plate 261 as the right optical image display section 26, a left light guide plate 262 as the left optical image display section 28, the right earphone 32, and the left earphone 34.

The right display drive section 22 includes a receiving section (Rx) 53, the right backlight (BL) control section 201 and the right backlight (BL) 221 functioning as the light source, the right LCD control section 211 and the right LCD 241 functioning as the display element, and a right projection optical system 251. It should be noted that the right backlight control section 201, the right LCD control section 211, the right backlight 221, and the right LCD 241 are also collectively referred to as an "image light generation section."

The receiving section 53 functions as a receiver for serial transmission between the control section 10 and the image display section 20. The right backlight control section 201 has a function of driving the right backlight 221 based on the control signal input thereto. The right backlight 221 is a light emitter such as an LED or electroluminescence (EL). The right LCD control section 211 has a function of driving the right LCD 241 based on the clock signal PCLK input via the receiving section 53, the vertical sync signal VSync, the horizontal sync signal HSync, and the right eye image data. The right LCD 241 is a transmissive liquid crystal panel having a plurality of pixels arranged in a matrix.

Figure 3:
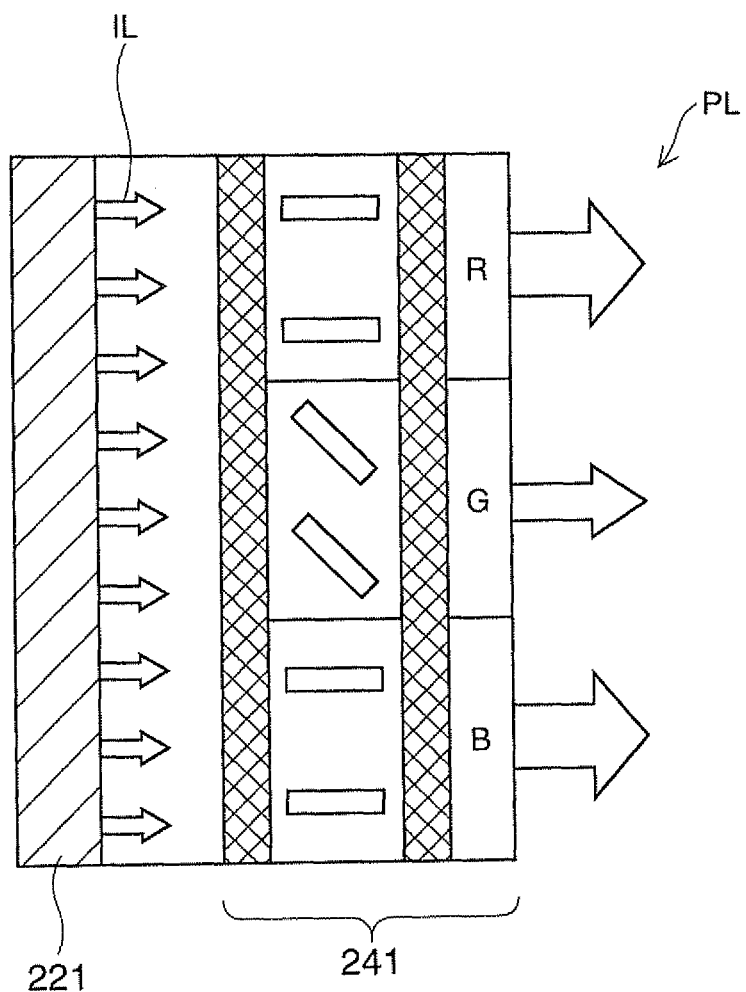
FIG. 3 is an explanatory diagram showing how image light is emitted by an image light generation section.

FIG. 3 is an explanatory diagram showing how the image light is emitted by the image light generation section. The right LCD 241 has a function of modulating the illumination light IL emitted from the right backlight 221 by driving the liquid crystal corresponding to each of the pixel positions arranged in a matrix to thereby vary the transmission of the light transmitted through the right LCD 241. It should be noted that although it is assumed in the present embodiment that the backlight type is adopted as shown in FIG. 3, it is also possible to adopt a configuration of emitting the image light using a front light type or a reflecting type.

The right projection optical system 251 shown in FIG. 2 is formed of a collimating lens for converting the image light emitted from the right LCD 241 into the light beam in a parallel state. The right light guide plate 261 as the right optical image display section 26 guides the image light output from the right projection optical system 251 to the right eye RE of the user while reflecting it along a predetermined light path. It should be noted that the right projection optical system 251 and the right light guide plate 261 are also collectively referred to as a "light guide section."

The left display drive section 24 includes a receiving section (Rx) 54, the left backlight (BL) control section 202 and the left backlight (BL) 222 functioning as the light source, the left LCD control section 212 and the left LCD 242 functioning as the display element, and a left projection optical system 252. It should be noted that the left backlight control section 202, the left LCD control section 212, the left backlight 222, and the left LCD 242 are also collectively referred to as an "image light generation section," and the left projection optical system 252 and the left light guide plate 262 are also collectively referred to as a "light guide section." The right display drive section 22 and the left display drive section 24 are provided as a pair, and since the components of the left display drive section 24 have substantially the same configurations and operations as the respective components of the right display drive section 22 described above, the detailed explanation thereof will be omitted.

Figure 4:
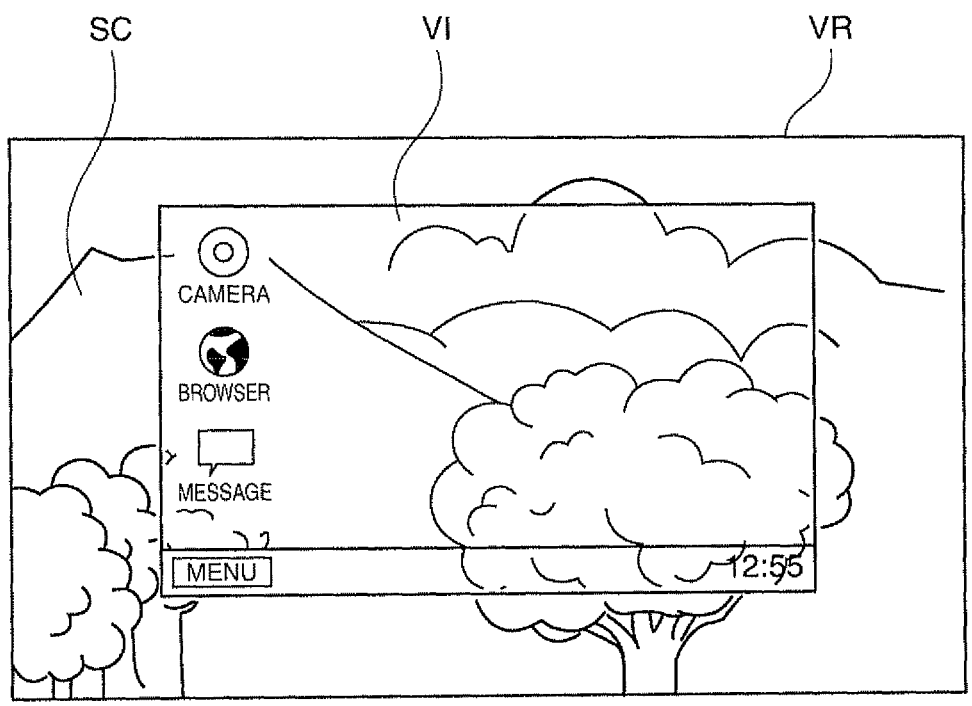
FIG. 4 is an explanatory diagram showing an example of a virtual image recognized by the user.

FIG. 4 is an explanatory diagram showing an example of a virtual image recognized by the user. By the image light guided to both eyes of the user of the head mount display HM being imaged on the retinas of the user in such a manner as described above, the user can visually recognize the virtual image. As shown in FIG. 4, the virtual image VI is displayed inside the visual field VR of the user of the head mount display HM. Further, the user can see the background SC through the right optical image display section 26 and the left optical image display section 28 in the other part of the visual field VR of the user than the part where the virtual image VI is displayed. It should be noted that in the head mount display HM according to the present embodiment it is arranged that the background SC can be seen behind the virtual image VI through the part of the visual field VR of the user where the virtual image VI is displayed.

A-2. Standby Process of Head-Mount Type Display Device

Figure 5:
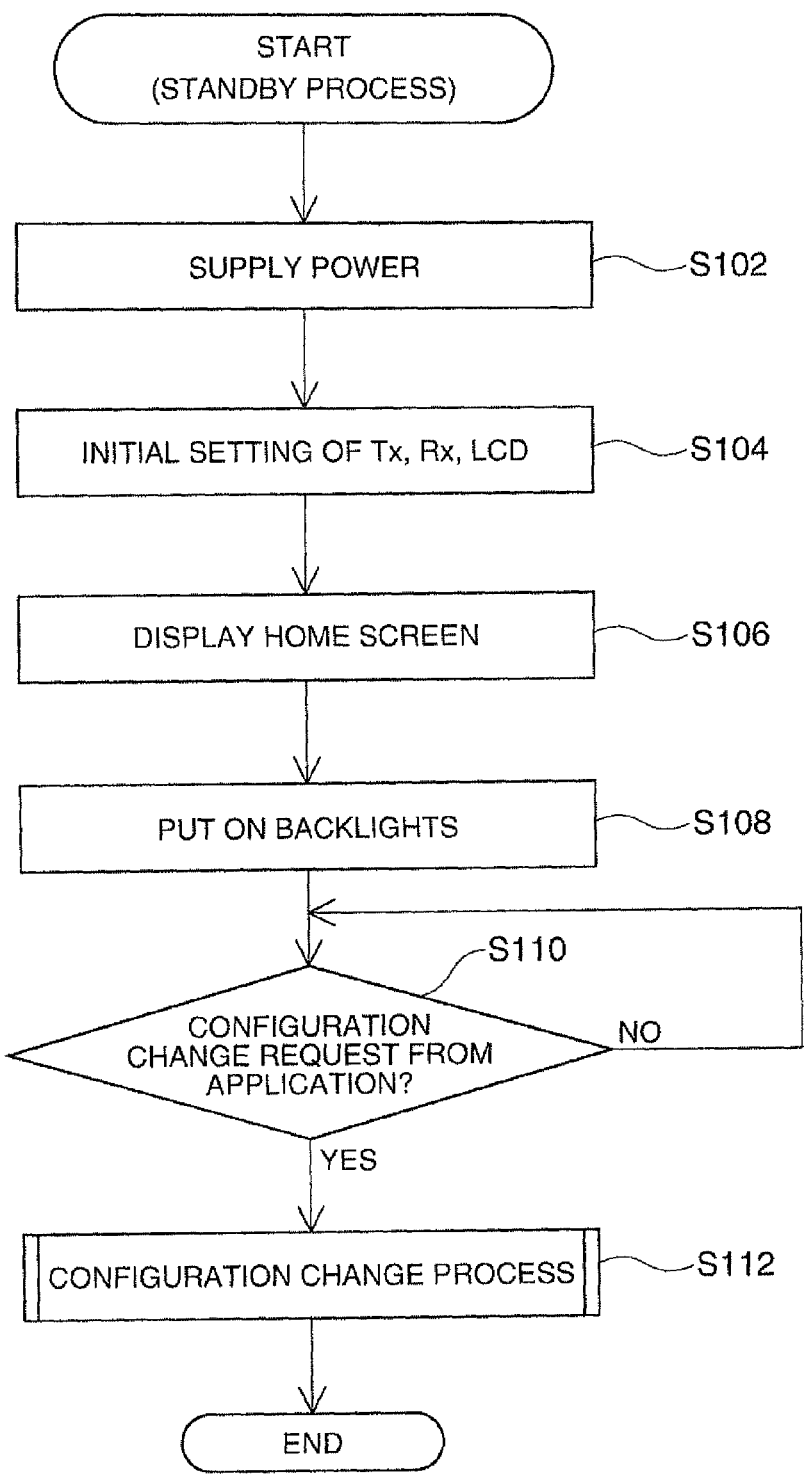
FIG. 5 is a flowchart showing a procedure of a standby process of the head mount display.

FIG. 5 is a flowchart showing a procedure of a standby process of the head mount display HM. The standby process of the head mount display HM is a process of the control section 10 controlling the image display by the image display section 20.

Firstly, the power supply 130 of the control section 10 supplies (step S102) each section of the head mount display HM with electrical power. Subsequently, the display control section 190 of the control section 10 performs (step S104) initial setting of the transmitting sections 51, 52, the receiving sections 53, 54, the right LCD control section 211, and the left LCD control section 212. Specifically, the display control section 190 transmits the signal for performing setting for correctly performing the serial transmission, for example the signal for setting the clock rate or the number of channels, to the transmitting sections 51, 52, and the receiving sections 53, 54. The clock rate (bps) denotes the frequency of a signal (a clock signal) for synchronizing the transmitting sections and the receiving sections with each other. The transmitting sections 51, 52 and the receiving sections 53, 54 each include a PLL circuit not shown, and it becomes possible to perform transmission in sync with each other using the PLL circuits. Further, the display control section 190 transmits a signal for the setting for appropriately performing the display in the LCD, for example a signal for setting the gamma value, to the right LCD control section 211 and the left LCD control section 212.

It should be noted that in the present embodiment it is assumed that the display control section 190 transmits the signals respectively to the transmitting sections, the receiving sections, and the LCD control sections. However, it is also possible to arrange that the display control section 190 transmits the signal only to the transmitting sections. In this case, the signals to the receiving sections and the LCD control sections are transmitted indirectly via the transmitting sections.

After the initial setting, the image processing section 160 and the display control section 190 of the control section 10 display (step S106) a home screen of the operating system. Specifically, the image processing section 160 performs the process described above on the image of the home screen input from the OS 150, then generates the image data Data representing the home screen, the vertical sync signal VSync, the horizontal sync signal HSync, and the clock signal PCLK, and then transmits them via the transmitting sections 51, 52. Further, the display control section 190 transmits the control signal indicating ON of the drive of the right LCD 241 by the right LCD control section 211 via the transmitting section 51, and the control signal indicating ON of the drive of the left LCD 242 by the left LCD control section 212 via the transmitting section 52, respectively. The right LCD control section 211 having received the signal via the receiving section 53 drives the right LCD 241 to thereby draw the image of the home screen. Similarly, the left LCD control section 212 having received the signal via the receiving section 54 drives the left LCD 242 to thereby draw the image of the home screen.

Subsequently, the display control section 190 of the control section 10 lights (step S108) the backlights. Specifically, the display control section 190 transmits the control signal indicating ON of the drive of the right backlight 221 by the right backlight control section 201, and the control signal indicating ON of the drive of the left backlight 222 by the left backlight control section 202 to the image display section 20. The right backlight control section 201 having received the signal lights the right backlight 221. Similarly, the left backlight control section 202 having received the signal lights the left backlight 222. As a result, the image light representing the image of the home screen drawn by the right LCD 241 and the left LCD 242 is emitted, and the virtual image VI representing the home screen is displayed in the visual field VR of the user.

After displaying the home screen, the display control section 190 of the control section 10 determines (step 3110) whether or not a configuration change request from an application exists. Specifically, the display control section 190 determines whether or not there is a request of changing the configuration of the image display method from a variety of applications. Here, the variety of applications include, for example, an application for setting or changing the image display method provided in advance as a function of the OS 150, a gaming application installed in the OS 150, an application for reproducing still images and moving images. Further, the image display method denotes the display method of the image drawn by the right LCD 241 and the left LCD 242 and then displayed as the virtual image VI in the visual field VR of the user, and includes, for example, the display direction, the display size, the number of colors, the number of frames per unit time, and so on of the image drawn (generated) in the right LCD 241 and the left LCD 242.

In the case (YES in the step S110) in which there exists the configuration change request from an application, the display control section 190 performs (step S112) a configuration change process. In contrast, in the case (NO in the step S110) in which there is no configuration change request from an application, the display control section 190 makes a transition of the process to the step S110 to thereby continue to monitor presence or absence of the configuration change request from an application.

A-3. Configuration Change Process

Figure 6:
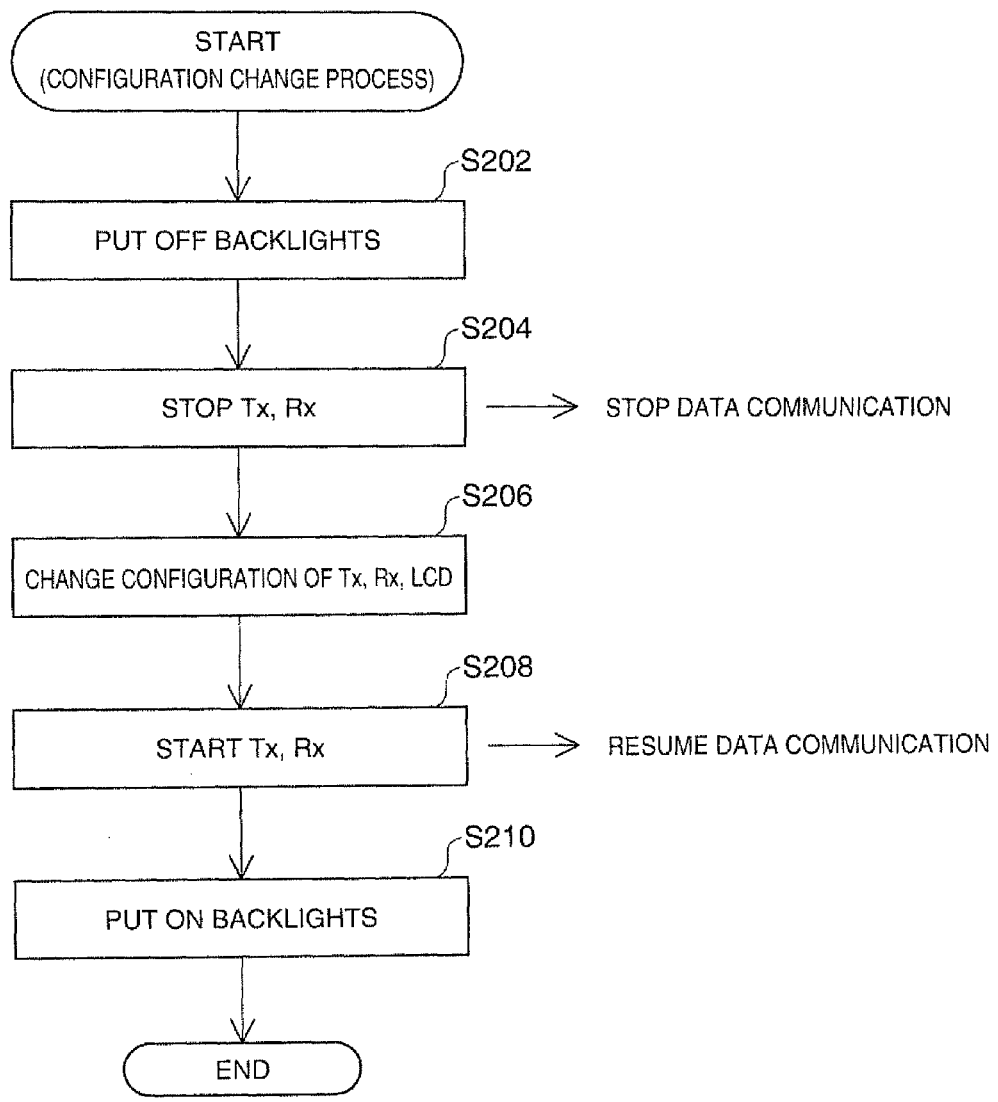
FIG. 6 is a flowchart showing a procedure of a configuration change process.
Figure 7:
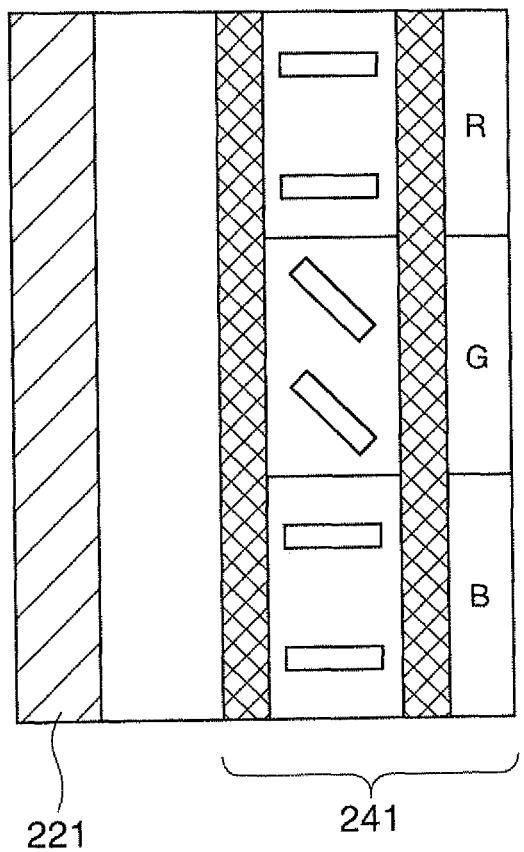
FIG. 7 is an explanatory diagram showing the state of the image light generation section in the step S202 shown in FIG. 6.

FIG. 6 is a flowchart showing a procedure of the configuration change process. FIG. 7 is an explanatory diagram showing the state of the image light generation section in the step S202 shown in FIG. 6. Firstly, the display control section 190 of the control section 10 lights (step S202) the backlights. Specifically, the display control section 190 transmits the control signal indicating OFF of the drive of the right backlight 221 by the right backlight control section 201, and the control signal indicating OFF of the drive of the left backlight 222 by the left backlight control section 202 to the image display section 20. The right backlight control section 201 having received the signal puts off the right backlight 221. Similarly, the left backlight control section 202 having received the signal puts off the left backlight 222. When the backlights are put off, since the image (specifically the image drawn by the right LCD 241 and the left LCD 242) generated by the image light generation section becomes not to be emitted as the image light, the display of the virtual image VI disappears from the visual field VR of the user.

Subsequently, the display control section 190 of the control section 10 stops (step S204) the transmitting sections 51, 52 and the receiving sections 53, 54. As a result, the data communication between the control section 10 and the image display section 20 is halted.

The display control section 190 of the control section 10 changes (step S206) the configuration of the transmitting sections 51, 52, the receiving sections 53, 54, the right LCD control section 211, and the left LCD control section 212. The configuration change of the transmitting sections 51, 52 and the receiving sections 53, 54 is caused by the change in the clock signal PCLK corresponding to the change in the data amount of the image data Data transmitted by the image processing section 160 when changing the image display method (e.g., the display direction, the display size, the number of colors, and the number of frames per unit time of the image drawn in the right LCD 241 and the left LCD 242). In order to appropriately perform (to prevent the malfunction) of the serial communication between the transmitting sections and the receiving sections in accordance with the change in the clock signal PCLK, it is necessary to operate the PLL circuits included in the transmitting sections 51, 52 and the receiving sections 53, 54 at a new clock rate corresponding to the clock signal PCLK having been changed. Therefore, the display control section 190 transmits the signals for setting the new clock rate and the number of channels corresponding to the clock signal POLK having been changed to the transmitting sections 51, 52 and the receiving sections 53, 54.

Further, the configuration change in the right LCD control section 211 and the left LCD control section 212 is caused by the necessity of the reconfiguration of the LCD display control section due to the change in the image display method. In order to appropriately perform the display in the LCD, the display control section 190 transmits signals for setting a new gamma value and so on to the right LCD control section 211 and the left LCD control section 212.

Subsequently, the display control section 190 of the control section 10 starts (step S208) the transmitting sections 51, 52 and the receiving sections 53, 54. As a result, the data communication based on the new clock rate and the number of channels is resumed between the control section 10 and the image display section 20. Specifically, the image processing section 160 starts the transmission of the image data Data under the clock signal POLK having been changed.

After resuming the operations of the transmitting section and the receiving section, the display control section 190 of the control section 10 lights (step S210) the backlights. Specifically, the display control section 190 transmits the control signal indicating ON of the drive of the right backlight 221 by the right backlight control section 201, and the control signal indicating ON of the drive of the left backlight 222 by the left backlight control section 202 to the image display section 20. When the backlights are put on, the image (specifically the image drawn by the right LCD 241 and the left LCD 242) generated by the image light generation section is emitted again as the image light, and the virtual image VI is displayed again in the visual field VR of the user.

Figure 8A:
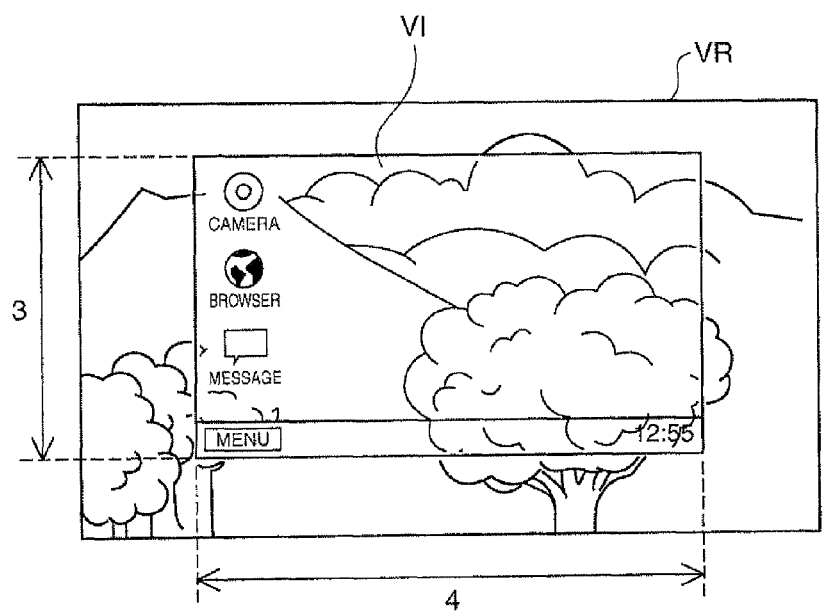
FIGS. 8A and 8B are explanatory diagrams showing an example of a virtual image VI in the case of changing an image display method.
Figure 8B:
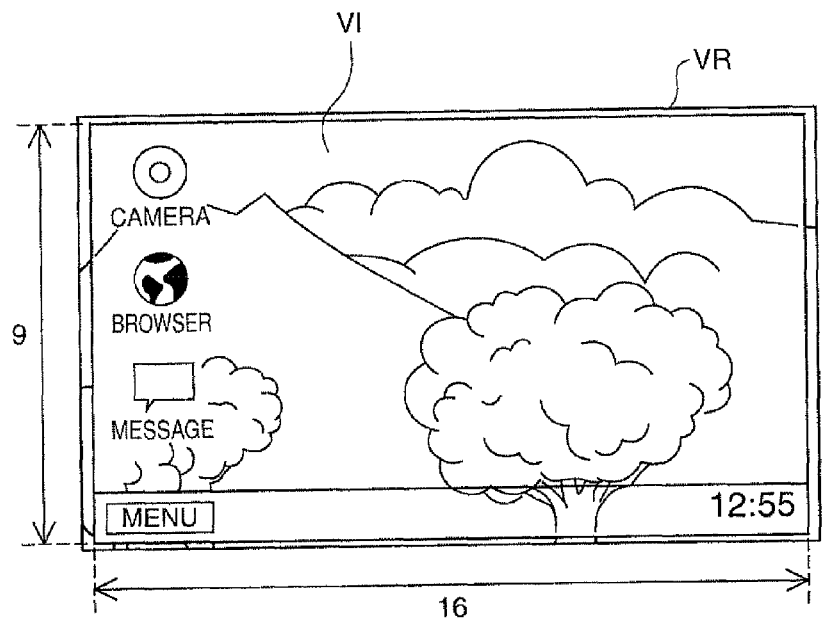

FIGS. 8A and 8B are explanatory diagrams showing an example of the virtual image VI in the case of changing the image display method. FIG. 8A shows the virtual image VI displayed in the visual field VR of the user before the image display method (the display size) is changed, namely before the configuration change process (FIG. 6) is performed. In the visual field VR of the user, there is displayed the virtual image VI having the size of a normal mode (e.g., the image is displayed in the central portions of the screens of the right LCD 241 and the left LCD 242 at a proportion of 4:3). In the state shown in FIG. 8A, if the user selects a full-screen mode (e.g., the image is displayed in the entire screens of the right LCD 241 and the left LCD 242 at a proportion of 16:9) using an application for setting or changing the image display method, the configuration change process (FIG. 6) is performed. FIG. 8B shows the virtual image VI displayed in the visual field VR of the user after the end of the step S210 of the configuration change process.

As described above, according to the first embodiment, in the head-mount type display device (head mount display HM) capable of making the user visually recognize the virtual image, the control section 10 controls (specifically, puts off the illumination light of the light source) the luminance of the light source of the image light generation section so as to degrade the visibility of the virtual image VI for a predetermined period of time in the case in which the disturbance in the data communication between the transmitting sections (the transmitting sections 51, 52) for transmitting the image data Data to the image display section 20 and the receiving sections (the receiving sections 53, 54) for receiving the image data Data on the image display section 20 side is presumed. The disturbance in the data communication between the transmitting sections and the receiving sections leads to the disturbance in the image generated by the LCD (the right LCD 241 and the left LCD 242) of the image light generation section. Therefore, if the visibility of the virtual image VI is degraded in the case in which the disturbance in the data communication is presumed, it is possible to realize the configuration with which it is difficult for the user to be aware of the disturbance in the image even in the case in which the disturbance is caused in the image generated by the LCD of the image light generation section. As a result, it is possible to provide the head-mount type display device capable of reducing the uncomfortable feeling provided to the user when the disturbance in image display occurs due to the disturbance in the data communication inside the head-mount type display device.

Specifically, since the control section 10 controls the luminance of the image light generation section so as to degrade the visibility of the virtual image VI for a predetermined period of time in the case in which the disturbance in the data communication between the transmitting sections and the receiving sections is presumed, namely in the case of changing the rate of the clock signal POLK of the transmitting sections (the transmitting sections 51, 52) in accordance with the change in the data amount of the image data Data transmitted between the transmitting sections and the receiving sections, it is possible to realize the configuration with which it is difficult for the user to be aware of the disturbance in the image even in the case in which the disturbance in the image occurs due to the change in the rate of the clock signal POLK.

Further, since the predetermined period of time corresponds to the period in which the transmitting sections 51, 52 and the receiving sections 53, 54 are halted, then the clock rate of the transmitting sections is changed, and then the operations of the transmitting sections and the receiving sections are resumed, it is possible to surely stop displaying the virtual image VI during the period in which the failure in the transmitting sections due to the restart of the PLL circuits is concerned. As a result, in the head mount display HM, even in the case in which the image display is disturbed when changing the display method of the image, the uncomfortable feeling provided to the user can be reduced.

B. Second Embodiment

In the second embodiment of the invention, the configuration of changing the luminance of the light source instead of switching between lighting and extinction of the light source in the configuration change process will be explained. Hereinafter, only the part having a configuration and an operation different from those of the first embodiment will be explained. It should be noted that in the drawings the constituents substantially the same as those of the first embodiment are denoted by the same reference numerals as in the first embodiment described above, and the detailed explanation thereof will be omitted.

B-1. Configuration of Head-Mount Type Display Device

The configuration of the head mount display HM in the second embodiment is roughly the same as that of the first embodiment explained with reference to FIGS. 1 through 4.

It should be noted that the display control section 190 of the control section 10 in the second embodiment transmits the control signal for designating the luminance of the right backlight 221 to the right backlight control section 201 together with the control signal for designating ON/OFF of the drive of the right backlight 221. As the control signal for designating the luminance of the right backlight 221, a pulse width modulation (PWM) signal is used in the present embodiment. It should be noted that hereinafter the control signal for designating the luminance of the backlight is also simply referred to as a "PWM signal."

The right backlight control section 201 changes the luminance of the right backlight 221 in accordance with the duty ratio of the PWM signal thus received. In other words, the right backlight control section 201 sets the luminance of the right backlight 221 high (i.e., makes the illumination light bright) if the duty ratio of the PWM signal is high, or sets the luminance of the right backlight 221 low (i.e., makes the illumination light dark) if the duty ratio is low. Similarly, the display control section 190 transmits the control signal (the PWM signal) for designating the luminance of the left backlight 222 also to the left backlight control section 202 together with the control signal for designating ON/OFF of the drive of the left backlight 222.

B-2. Standby Process of Head-Mount Type Display Device

The procedure of the standby process in the second embodiment is substantially the same as that in the first embodiment explained with reference to FIG. 5.

B-3. Configuration Change Process

Figure 9:
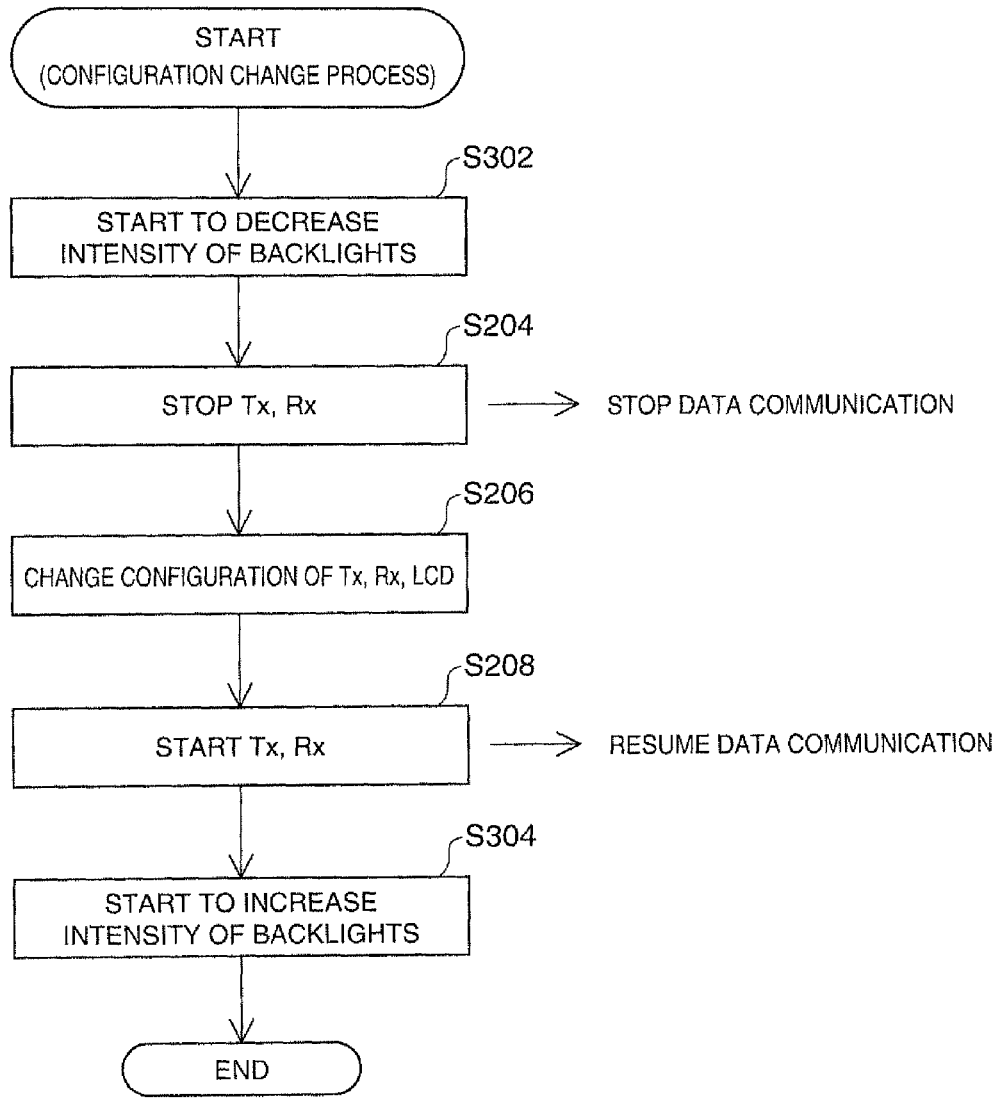
FIG. 9 is a flowchart showing a procedure of the configuration change process in a second embodiment of the invention.
Figure 10:
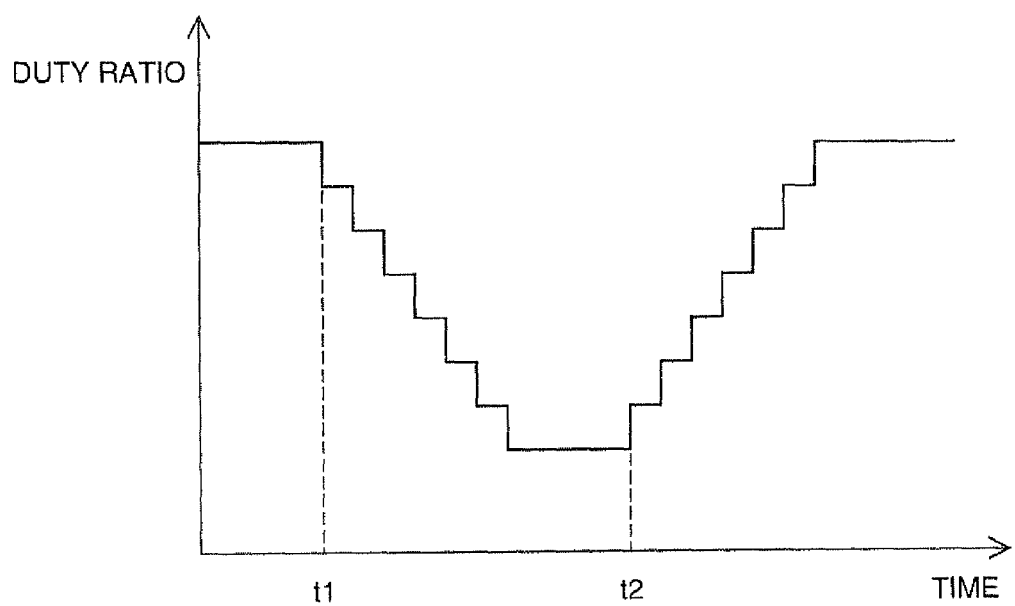
FIG. 10 is an explanatory diagram showing variation in a PWM signal transmitted by a display control section.

FIG. 9 is a flowchart showing a procedure of the configuration change process in the second embodiment. The only difference from the first embodiment shown in FIG. 6 is the point that the step S302 is provided instead of the step S202, and the step S304 is provided instead of the step S210, and the other part of the process is the same as in FIG. 6. FIG. 10 is an explanatory diagram showing variation in the PWM signal transmitted by a display control section 190.

In the step S302 of FIG. 9, the display control section 190 of the control section 10 starts to decrease the intensity of the backlights. Specifically, the display control section 190 decreases (time t1 in FIG. 10) the duty ratio of the PWM signal transmitted to the right backlight control section 201 and the left backlight control section 202 with time in a stepwise manner. It should be noted that the width and the time of decrement of the duty ratio can arbitrarily be determined. By decreasing the duty ratio of the PWM signal in a stepwise manner, the illumination light by the right backlight 221 and the left backlight 222 becomes darker (is decreased in the intensity) in a stepwise manner. Since the image light emitted by the image light generation section becomes weaker if the illumination light by the right backlight 221 and the left backlight 222 becomes darker, the virtual image VI displayed in the visual field VR of the user becomes faint and blurred display.

In the step S304 of FIG. 9, the display control section 190 of the control section 10 starts to increase the intensity of the backlights. Specifically, the display control section 190 increases (time t2 in FIG. 10) the duty ratio of the PWM signal transmitted to the right backlight control section 201 and the left backlight control section 202 with time in a stepwise manner. By increasing the duty ratio of the PWM signal in a stepwise manner, the illumination light by the right backlight 221 and the left backlight 222 becomes brighter (is increased in the intensity) in a stepwise manner. Since the image light emitted by the image light generation section becomes stronger if the illumination light by the right backlight 221 and the left backlight 222 becomes brighter, the virtual image VI displayed in the visual field VR of the user becomes clear and deep display.

As described above, according to the second embodiment, the control section 10 controls (specifically, decreases the intensity of the illumination light from the light source) the luminance of the image light generation section so as to degrade the visibility of the virtual image VI for a predetermined period of time in the case of varying the clock rate of the PLL circuits included in the transmitting sections 51, 52 when varying (further, varying the clock signal POLK for this purpose) the data amount of the image data Data to be transmitted to the image display section 20 in order to change the image display method. If the visibility of the virtual image VI is degraded, it is possible to realize the configuration with which it is difficult for the user to be aware of the disturbance in the image even in the case in which the disturbance occurs in the image drawn (generated) by the right LCD 241 and the left LCD 242 when changing the image display method (specifically, during the period of changing the clock rate of the PLL circuit and the restart). As a result, in the head mount display HM, even in the case in which the image display is disturbed when changing the display method of the image, the uncomfortable feeling provided to the user can be reduced.

Further, the control section 10 varies the luminance of the light source in a stepwise manner when decreasing and increasing the intensity of the illumination light by the light source. As a result, the virtual image VI displayed in the visual field VR of the user becomes the faint and blurred display during the period in which the setting of the transmitting sections and the receiving sections is performed, and then gradually becomes the clear and deep display after the completion of the setting of the transmitting sections and the receiving sections. Therefore, the uncomfortable feeling provided to the user can further be reduced compared to the case in which the display of the virtual image VI is rapidly flickered or switched.

C. Third Embodiment

In the third embodiment of the invention, there will be explained the configuration capable of reducing the uncomfortable feeling provided to the user when making the head mount display HM make a transition to a partial display mode in the standby process of the head mount display HM. Hereinafter, only the part having a configuration and an operation different from those of the first embodiment will be explained.

It should be noted that in the drawings the constituents substantially the same as those of the first embodiment are denoted by the same reference numerals as in the first embodiment described above, and the detailed explanation thereof will be omitted.

C-1. Configuration of Head-Mount Type Display Device

The configuration of the head mount display HM in the third embodiment is substantially the same as that of the first embodiment explained with reference to FIGS. 1 through 4.

C-2. Standby Process of Head-Mount Type Display Device

Figure 11:
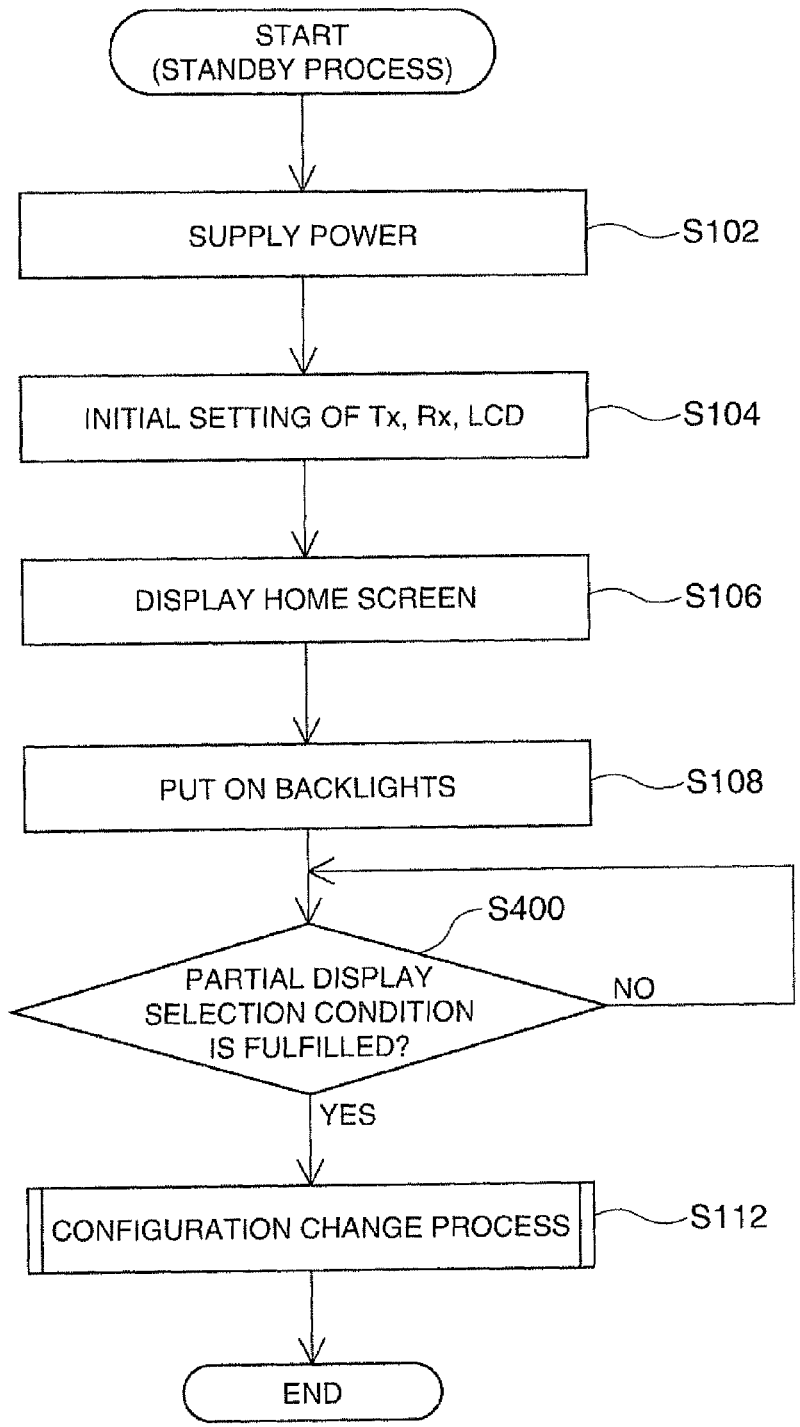
FIG. 11 is a flowchart showing a procedure of the standby process in a third embodiment of the invention.

FIG. 11 is a flowchart showing a procedure of the standby process in the third embodiment. The only difference from the first embodiment shown in FIG. 5 is the point that the step S400 is provided instead of the step S110, and the other operations are the same as those of the first embodiment.

After displaying the home screen via the process of the steps S106, S108 shown in FIG. 11, the display control section 190 of the control section 10 determines (step S400) whether or not a partial display selection condition is fulfilled. The partial display selection condition is an event trigger for switching the head mount display HM from the full-screen mode to the partial display mode in accordance with the fulfillment of a predetermined condition. It should be noted that in the present embodiment the "full-screen mode" denotes a display mode for displaying an image on the entire maximum area capable of displaying the image in the display elements (the right LCD 241, the left LCD 242). In contrast, the "partial display mode" denotes a display mode for displaying an image only on a part of the maximum area capable of displaying the image in the display elements (the right LCD 241, the left LCD 242).

The "predetermined condition" can arbitrarily be determined. It is possible to, for example, determine the predetermined condition by alternatively selecting from or combining the following conditions.

Condition (a1): the remaining amount of the power supply 130 (secondary battery) becomes equal to or smaller than a predetermined amount. It should be noted that the predetermined amount can arbitrarily be determined.

Condition (a2): the state in which an operation (e.g., an operation to the touch pad 14 and the arrow keys 16) to the head mount display HM is not detected continues for a predetermined period of time. It should be noted that the predetermined period of time can arbitrarily be determined.

Condition (a3): start-up of an application designated in advance in the OS is detected.

Condition (a4): a power saving request from the outside is obtained. Specifically, there can be cited the case in which the display control section 190 obtains the fact that the power saving is selected via the touch pad 14 or the arrow keys 16 provided to the control section 10.

If the partial display selection condition is not fulfilled (NO in the step S400), the display control section 190 makes the process make a transition to the step S400 to thereby wait for the fulfillment of the condition. In contrast, in the case (YES in the step S400) in which the partial display selection condition is fulfilled, the display control section 190 performs (step S112) the configuration change process.

C-3. Configuration Change Process

The procedure of the configuration change process in the third embodiment is roughly the same as that in the first embodiment shown in FIG. 6. Specifically, the display control section 190 of the control section 10 stops (step S204) the transmitting sections 51, 52 and the receiving sections 53, 54 after putting off (step S202) the backlights. Subsequently, the display control section 190 changes (step S206) the configuration of the transmitting sections 51, 52, the receiving sections 53, 54, the right LCD control section 211, and the left LCD control section 212.

The configuration change of the transmitting sections 51, 52 and the receiving sections 53, 54 in the third embodiment is performed due to the fact that the rate of the clock signal PCLK is lowered with decrease in the data amount of the image data Data transmitted by the image processing section 160 in the case of making a transition from the full-screen mode to the partial display mode. Similarly to the case of the first embodiment, in order to appropriately perform the serial transmission between the transmitting sections and the receiving sections in accordance with the decrease in the rate of the clock signal PCLK, the display control section 190 transmits the signals for setting a new clock rate corresponding to the clock signal PCLK having been changed and the number of channels to the transmitting sections 51, 52 and the receiving section 53, 54. Further, the configuration change in the right LCD control section 211 and the left LCD control section 212 is caused by the necessity of the reconfiguration of the LCD display control section due to the change in the image display method. In order to appropriately perform the display in the LCD, the display control section 190 transmits signals for setting a new gamma value and so on to the right LCD control section 211 and the left LCD control section 212.

After the configuration change in the step S206, the display control section 190 of the control section 10 starts (step S208) the transmitting sections 51, 52 and the receiving sections 53, 54. As a result, the image processing section 160 starts the transmission of the vertical sync signal VSync, the horizontal sync signal HSync both having been changed, and the image data Data with the reduced data amount under the clock signal PCLK with the lowered clock rate. After resuming the operations of the transmitting section and the receiving section, the display control section 190 of the control section 10 lights (step S210) the backlights. When the backlights are put on, the image (specifically the image drawn by the right LCD 241 and the left LCD 242) generated by the image light generation section is emitted again as the image light, and the virtual image VI is displayed again in the visual field VR of the user.

Figure 12A:
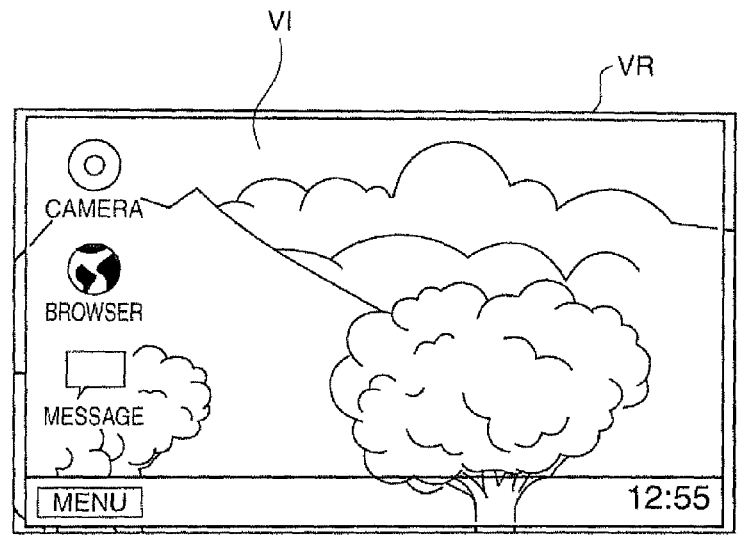
FIGS. 12A and 12B are explanatory diagrams showing an example of a virtual image in the case of making a transition from a full-screen mode to a partial display mode.
Figure 12B:
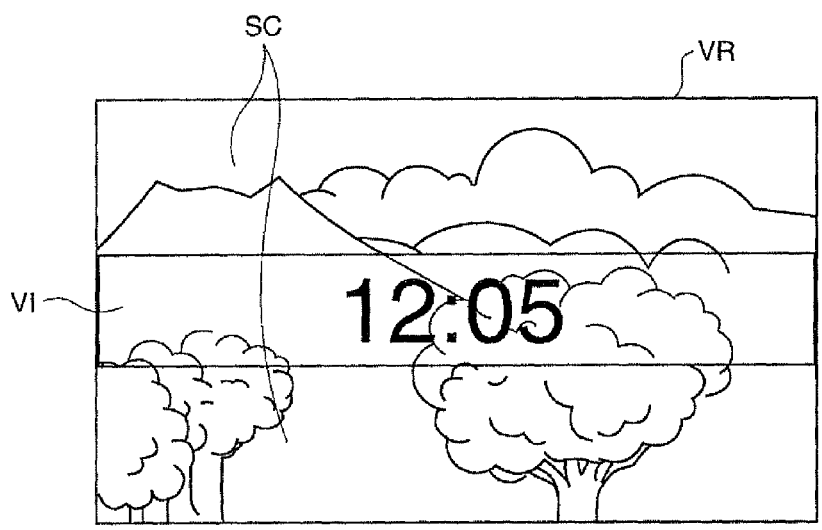

FIGS. 12A and 12B are explanatory diagrams showing an example of the virtual image VI in the case of making a transition from the full-screen mode to the partial display mode. FIG. 12A shows the virtual image VI displayed in the visual field VR of the user in the full-screen mode. Since the image is displayed in the entire screen of the right LCD 241 and the left LCD 242 in the full-screen mode, the virtual image VI is displayed so as to occupy the entire visual field VR of the user. If the partial display selection condition is fulfilled in the state shown in FIG. 12A, namely in the case in which, for example, the state of detecting no operation to the head mount display HM continues for a predetermined period of time, the configuration change process (FIG. 6) is performed.

FIG. 12B shows the virtual image VI displayed in the visual field VR of the user after the transition to the partial display mode, in other words, the end of the step S210 of the configuration change process. In the partial display mode, the image is displayed on only a part of the right LCD 241 and the left LCD 242 based on the vertical sync signal VSync and the horizontal sync signal HSync both having been changed. Therefore, the visual field VR of the user is mostly occupied by the background SC, and the virtual image VI is formed in only a part thereof. It should be noted that in the present embodiment, it is assumed that an image indicating the standby state such as a clock time display is displayed in the partial display mode.

As described above, according to the third embodiment, the control section 10 controls the luminance of the image light generation section so as to degrade the visibility of the virtual image VI by putting off the light source (the backlights) in the case in which the disturbance in the data communication between the transmitting sections and the receiving sections is presumed, namely in the case of arranging that the image generated in the display elements (the right LCD 241 and the left LCD 242) occupies only a part of each the display areas of the display elements (in other words, the head mount display HM is switched from the full-screen mode to the partial display mode). Therefore, even in the case in which the image display is disturbed when switching the head mount display HM from the full-screen mode to the partial display mode, the uncomfortable feeling provided to the user can be reduced.

Further, since the clock frequency is lowered in the partial display mode in the third embodiment, the power consumption of the head mount display HM can be suppressed to a lower level compared to the full-screen mode. Therefore, if the condition (a1) is selected as the partial display condition, it is possible to set the head mount display HM to the power saving state in the case in which the remaining level of the secondary battery becomes low. Therefore, it is possible to elongate the operating time of the head mount display HM which can be driven by a battery. Further, if the condition (a2) is selected as the partial display condition, it is possible to set the head mount display HM to the power saving state in accordance with the operation from the touch pad 14 and the arrow keys 16. Further, if the condition (a3) is selected as the partial display condition, it is possible to set the head mount display HM to the power saving state in accordance with the start-up of the application designated in advance. Further, if the condition (a4) is selected as the partial display condition, it is possible to set the head mount display HM to the power saving state in the case in which no operation is performed to the head mount display HM for a long time.

D. Fourth Embodiment

In the fourth embodiment of the invention, there will be explained the configuration of detecting a false operation of the head mount display HM due to an external noise or the like to thereby make it possible to perform an automatic restoration in the standby process of the head mount display HM, and reducing the uncomfortable feeling provided to the user in the automatic restoration. Hereinafter, only the part having a configuration and an operation different from those of the first embodiment will be explained. It should be noted that in the drawings the constituents substantially the same as those of the first embodiment are denoted by the same reference numerals as in the first embodiment described above, and the detailed explanation thereof will be omitted.

D-1. Configuration of Head-Mount Type Display Device

Figure 13:
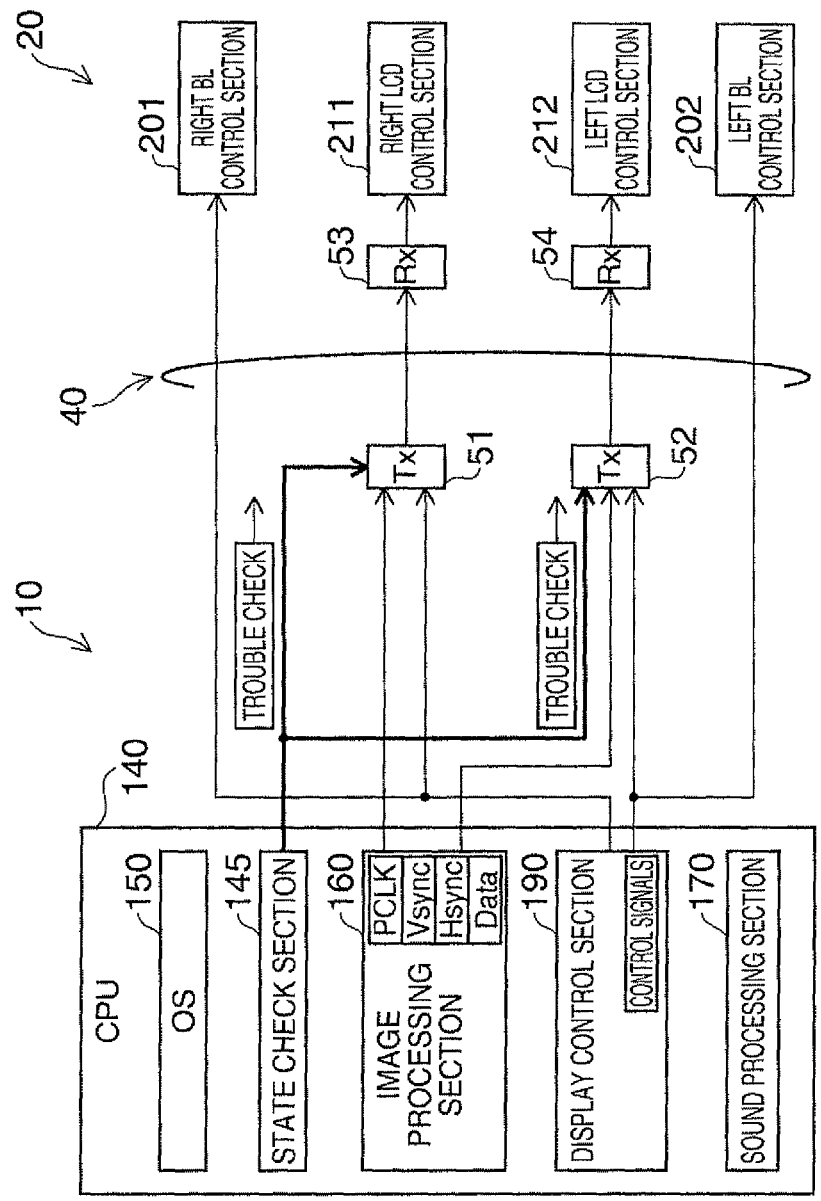
FIG. 13 is a block diagram functionally showing a part of the configuration of the head mount display according to a fourth embodiment of the invention.

FIG. 13 is a block diagram functionally showing a part of the configuration of the head mount display HM according to the fourth embodiment. FIG. 13 shows only a pert of the control section 10 and only a part of the image display section 20 for the sake of convenience of illustration. It should be noted that the configuration of the part not shown is substantially the same as that of the first embodiment shown in FIG. 2.

As shown in FIG. 13, the CPU 140 in the fourth embodiment is different from that of the first embodiment only in the point that a state check section 145 is further provided. The state check section 145 periodically checks the states of the transmitting sections 51, 52. Specifically, for example, by periodically referring to the values of registers representing the status of the transmitting sections 51, 52, the state check section 145 can detect a trouble occurring in the transmitting sections 51, 52. Further, it is also possible for the state check section 145 to have a configuration of making the receiving sections 53, 54 test the parity bits of the received packet, and referring to the test result to thereby detect presence of absence of a defect (e.g., noise contamination) in the received packet received by the receiving sections 53, 54. Further, the state check section 145 can perform both of the reference of the registers in the transmitting sections and the reference of the test result of the parity bits of the received packet.

D-2. Standby Process of Head-Mount Type Display Device

Figure 14:
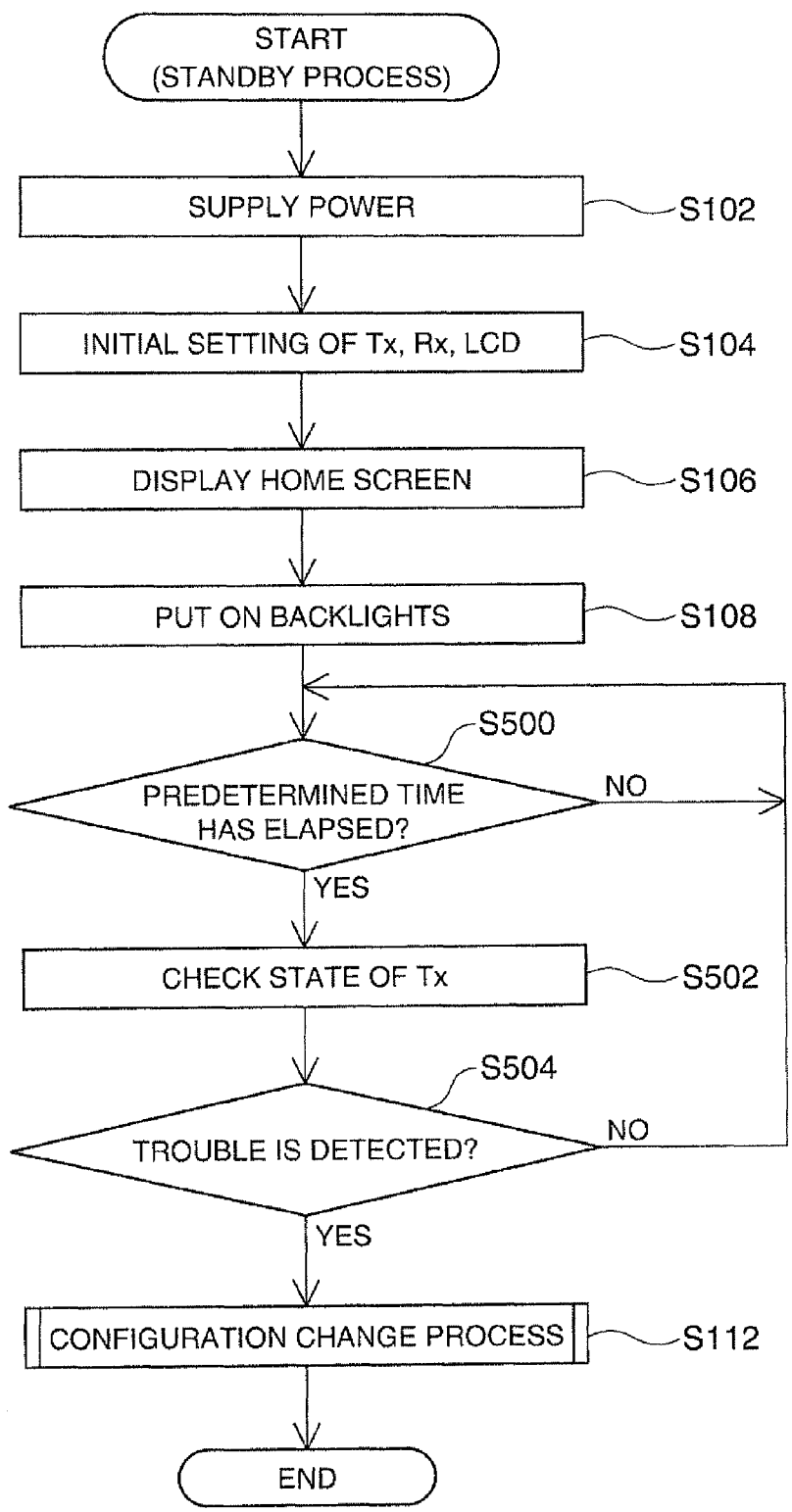
FIG. 14 is a flowchart showing a procedure of the standby process in the fourth embodiment.

FIG. 14 is a flowchart showing a procedure of the standby process in the fourth embodiment. The only difference from the first embodiment shown in FIG. 5 is the point that the steps S500 through S504 are provided instead of the step S110, and the other operations are the same as those of the first embodiment.

After displaying the home screen via, the process of the steps S106, S108 shown in FIG. 14, the state check section 145 of the control section 10 determines (step S500) whether or not a predetermined period of time has elapsed. Here, the "predetermined period of time" is the period indicating the intervals at which the state check section 145 checks the states of the transmitting sections 51, 52, and can arbitrarily be determined. If it is determined that the predetermined period of time has not elapsed (NO in the step S500), the state check section 145 makes the process make a transition to the step S500 to thereby wait for the elapse of the predetermined period of time. In contrast, if it is determined that the predetermined period of time has elapsed (YES in the step S500), the state check section 145 checks (step S502) the states of the transmitting sections 51, 52.

Subsequently, the state check section 145 determines (step S504) whether or not a trouble is detected in the transmitting sections 51, 52. If no trouble is detected in both of the transmitting sections 51, 52 (NO in the step S504), the state check section 145 makes the process make a transition to the step S500 to thereby wait for the elapse of the predetermined period of time. In contrast, if a trouble is detected in at least either one of the transmitting sections 51, 52 (YES in the step S504), the state check section 145 instructs (step S112) the display control section 190 to perform the configuration change process (FIG. 6) in order to reconfigure the transmitting sections 51, 52 and the receiving sections 53, 54. It should be noted that if the configuration of checking presence or absence of a defect in the received packet is adopted in the state check section 145, whether the test result of the parity bits of the received packet is normal or anomalous is determined in the step S504.

D-3. Configuration Change Process

The procedure of the configuration change process in the fourth embodiment is the same as that in the first embodiment shown in FIG. 6. It should be noted that in the configuration change process of the fourth embodiment, the "configuration change in the right LCD control section 211 and the left LCD control section 212" out of the step S206 can be omitted. This is because, in many cases those affected by the external noise and causing the malfunction are the transmitting sections 51, 52 and the receiving sections 53, 54 located adjacent to the connection section 40, and further, the reconfiguration of the LCD control section requires longer time compared to the reconfiguration of the transmitting sections and the receiving sections.

As described above, according to the fourth embodiment, the state check section 145 of the control section 10 can automatically detect the trouble of the transmitting sections by periodically checking the states of the transmitting sections (the transmitting sections 51, 52). Further, since the state check section 145 of the control section 10 controls the luminance of the image light generation section so as to degrade the visibility of the virtual image VI for a predetermined period of time in the case in which the disturbance in the data communication between the transmitting sections and the receiving sections is presumed, namely in the case of detecting the trouble in the transmitting sections or in the case of detecting the defect in the received packet, it is possible to realize the configuration with which it is difficult for the user to be aware of the disturbance in the image even in the case in which the disturbance in the image occurs due to, for example, the reconfiguration of the transmitting sections.

E. Fifth Embodiment

In the fifth embodiment of the invention, there will be explained the configuration capable of reducing the uncomfortable feeling provided to the user when the transfer source of the image data to the head mount display HM is switched in the standby process of the head mount display HM. Hereinafter, only the part having a configuration and an operation different from those of the first embodiment will be explained. It should be noted that in the drawings the constituents substantially the same as those of the first embodiment are denoted by the same reference numerals as in the first embodiment described above, and the detailed explanation thereof will be omitted.

E-1. Configuration of Head-Mount Type Display Device

The configuration of the head mount display HM in the fifth embodiment is substantially the same as that of the first embodiment explained with reference to FIGS. 1 through 4.

E-2. Standby Process of Head-Mount Type Display Device

Figure 15:
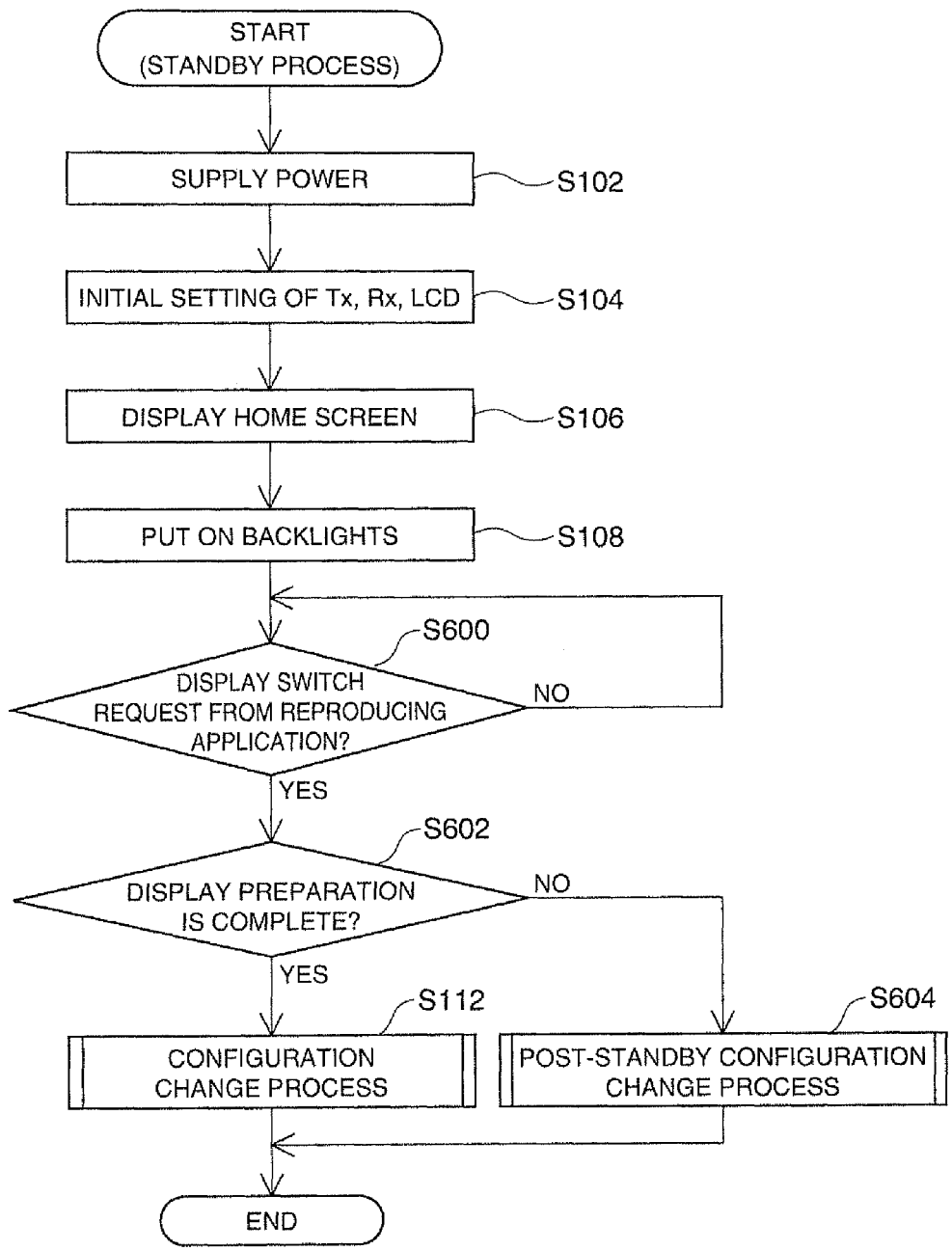
FIG. 15 is a flowchart showing a procedure of the standby process in a fifth embodiment of the invention.
Figure 16:
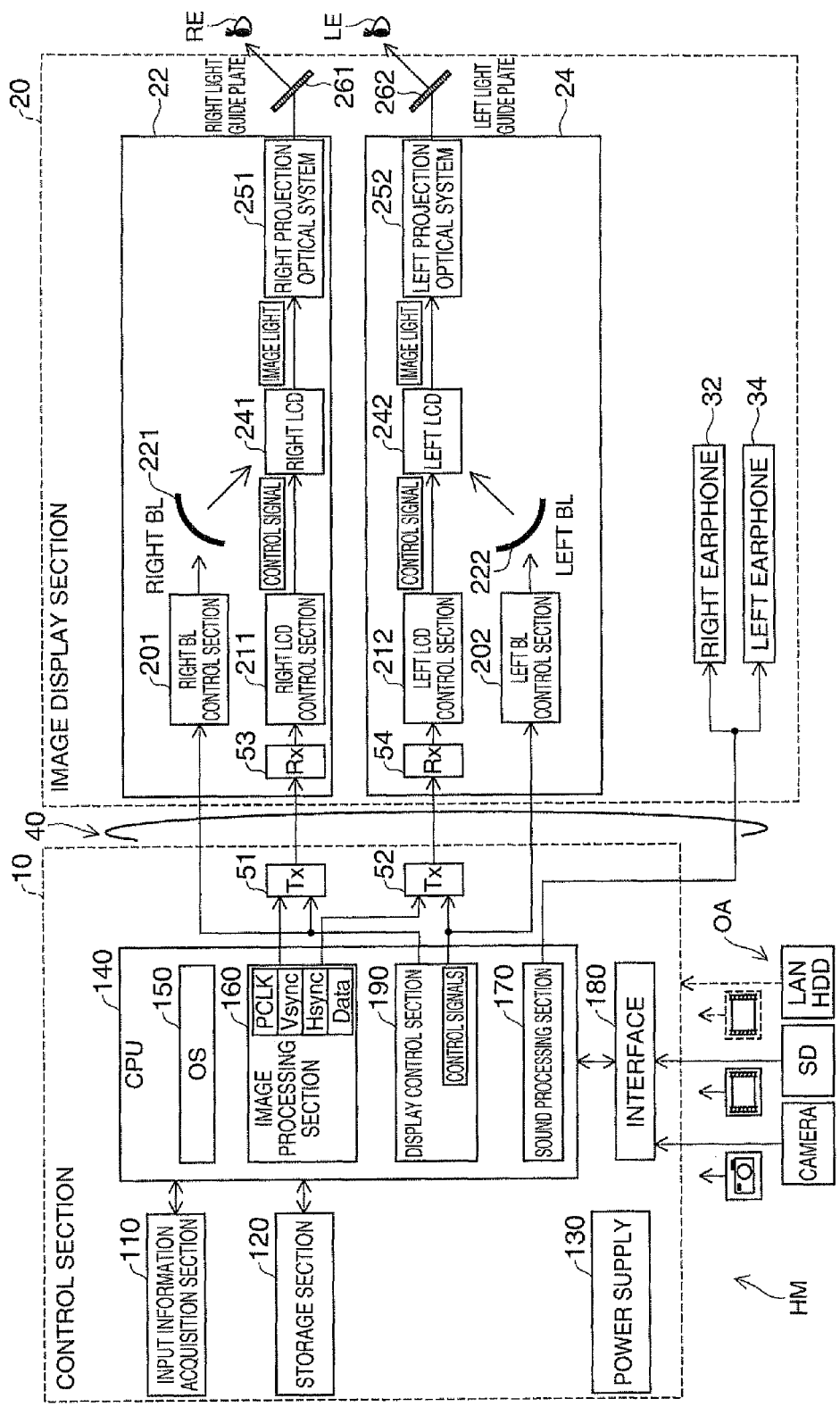
FIG. 16 is an explanatory diagram showing a state in which a plurality of external devices is connected to the head mount display.

FIG. 15 is a flowchart showing a procedure of the standby process in the fifth embodiment. The only difference from the first embodiment shown in FIG. 5 is the point that the steps S600 through S604 are provided instead of the step S110, and the other operations are the same as those of the first embodiment. FIG. 16 is an explanatory diagram showing a state in which a plurality of external devices OA is connected to the head mount display HM.

After displaying the home screen via the process of the steps S106, S108 shown in FIG. 15, the display control section 190 of the control section 10 determines (step S600) whether or not a display switch request from a reproducing application is present. Here, the reproducing application denotes an application for reproducing the content including an image (a still image or a moving image), a sound, and so on on the head mount display HM. The reproducing application includes, for example, those provided in advance as a function of the OS 150 and those installed in the OS 150 by the user or the like.

The case in which a "camera" as the external device OA is connected to the interface 180 (e.g., the USB interface) of the head mount display HM as shown in FIG. 16 is cited for consideration. The OS 150 detects the connection of the camera, and then automatically starts the reproducing application assigned to the camera in advance inside the OS 150. The reproducing application thus started up transmits (step S600) the display switch request to the display control section 190. Further, in the case in which an "SD card" as the external device OA is connected, the OS 150 detects the connection of the SD card newly connected thereto, and then automatically starts up the reproducing application assigned in advance to the SD card inside the OS 150. Also in this case, the reproducing application newly started up similarly transmits the display switch request to the display control section 190.

If the display switch request from the reproducing application is absent (NO in the step S600 in FIG. 15), the display control section 190 makes the process make a transition to the step S600 to thereby wait for the display switch request. In contrast, in the case (YES in the step S600) in which there exists the display switch request from the reproducing application, the display control section 190 determines (step S602) whether or not the display preparation is complete. Specifically, the display control section 190 determines that "the display preparation is complete" in the case in which, for example, the content input via the interface 180 is neither compressed nor modulated, or the content does not need to be buffered in the storage section 120. It should be noted that the necessity of buffering the content can be determined based on, for example, the type of the external device OA, or the data transfer rate of the interface 180 used.

In the case (YES in the step S602) in which the display preparation is complete, the display control section 190 performs (step S112) the configuration change process. In contrast, in the case (NO in the step S602) in which the display preparation is not complete, the display control section 190 performs (step S604) a post-standby configuration change process.

E-3. Configuration Change Process

The procedure of the configuration change process in the fifth embodiment is the same as that in the first embodiment shown in FIG. 6.

E-4. Post-Standby Configuration Change Process

Figure 17:
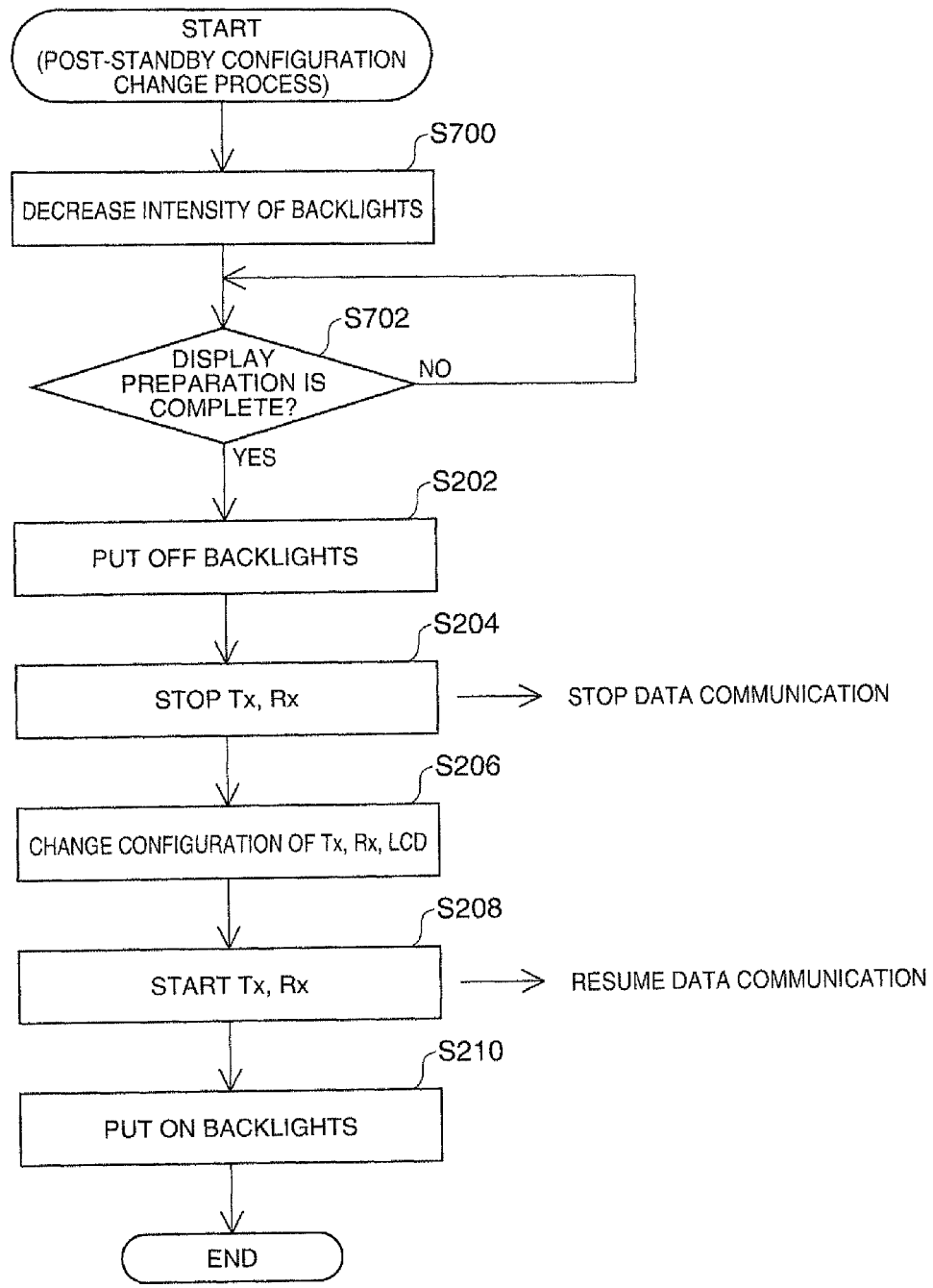
FIG. 17 is a flowchart showing a procedure of a post-standby configuration change process.

FIG. 17 is a flowchart showing a procedure of the post-standby configuration change process. Firstly, the display control section 190 of the control section 10 decreases (step S700) the intensity of the backlights. It should be noted that the method of decreasing the intensity of the backlights is as explained in the second embodiment. It should be noted that in the step S700 it is possible to make the illumination light by the right backlight 221 and the left backlight 222 dark in a stepwise manner by decreasing the duty ratio of the PWM signal with time in a stepwise manner, or it is possible to decrease the intensity of the illumination light by the right backlight 221 and the left backlight 222 to a predetermined brightness level by decreasing the duty ratio of the PWM signal to a predetermined value.

After decreasing the intensity of the backlights, the display control section 190 determines again (step S702) whether or not the display preparation is complete. Specifically, the display control section 190 determines that "the display preparation is complete" in the case in which the demodulation or development of the content thus input is terminated, or in the case in which the buffering of some amount of the content input thereto in the storage section is complete. If the display preparation is not complete (NO in the step S702), the display control section 190 makes the process make a transition to the step S702 to thereby wait until the display preparation becomes complete. In contrast, if the display preparation is complete (YES in the step S702), the display control section 190 makes the process make a transition to the step S202 to thereby put off the backlights. The process after the step S202 is the same as in the configuration change process (FIG. 6).

As described above, according to the fifth embodiment, the control section 10 controls the luminance of the image light generation section so as to degrade the visibility of the virtual image VI for a predetermined period of time in the case in which the disturbance in the data communication between the transmitting sections and the receiving sections is presumed, namely in the case in which the transfer source of the content including the image data to the control section 10 is switched from a certain external device (the external device OA) to another external device (the external device OA) (specifically, in the case of receiving the display switch request from the reproducing application generated in accordance with the switching between the external devices). Therefore, it is possible to realize the configuration with which it is difficult for the user to be aware of the disturbance in the image even in the case in which the disturbance is caused in the image due to the switching between the image data transfer source devices.

Further, according to the fifth embodiment, since the control section 10 is provided with a network interface (a wireless LAN interface) to which the external device to be the transfer source of the image data is connected, it is also possible to connect, for example, a hard disk (the LAN HDD shown in FIG. 16) compatible with a wireless LAN thereto. Therefore, it is possible to provide the head-mount type display device further compatible with the Digital Living Network Alliance (DLNA) in the application example 6.

F. Sixth Embodiment

In the sixth embodiment of the invention, there will be explained the configuration capable of reducing the uncomfortable feeling provided to the user when switching between 2D/3D display modes in the standby process of the head mount display HM. Hereinafter, only the part having a configuration and an operation different from those of the first embodiment will be explained. It should be noted that in the drawings the constituents substantially the same as those of the first embodiment are denoted by the same reference numerals as in the first embodiment described above, and the detailed explanation thereof will be omitted.

F-1. Configuration of Head-Mount Type Display Device

The configuration of the head mount display HM in the sixth embodiment is roughly the same as that of the first embodiment explained in FIGS. 1 through 4.

It should be noted that the head mount display HM according to the sixth embodiment can be switched between the two modes, namely the 2D display mode and the 3D display mode. In the 2D display mode, the image processing section 160 outputs the same image data Data (RGB data) as the right eye image data and the left eye image data. In the 3D display mode, the image processing section 160 generates different image data Data (RGB data) respectively as the right eye image data and the left eye image data, and then outputs them. By making the right eye image data and the left eye image data different from each other, it becomes possible to make the user visually recognize the 3D virtual image VI. Further, the switching between the 2D display mode and the 3D display mode can be received in accordance with the selection using the touch pad 14 or the arrow keys 16 of the control section 10, or it is possible to provide a 2D/3D switching button outside the housing of the control section 10.

F-2. Standby Process of Head-Mount Type Display Device

Figure 18:
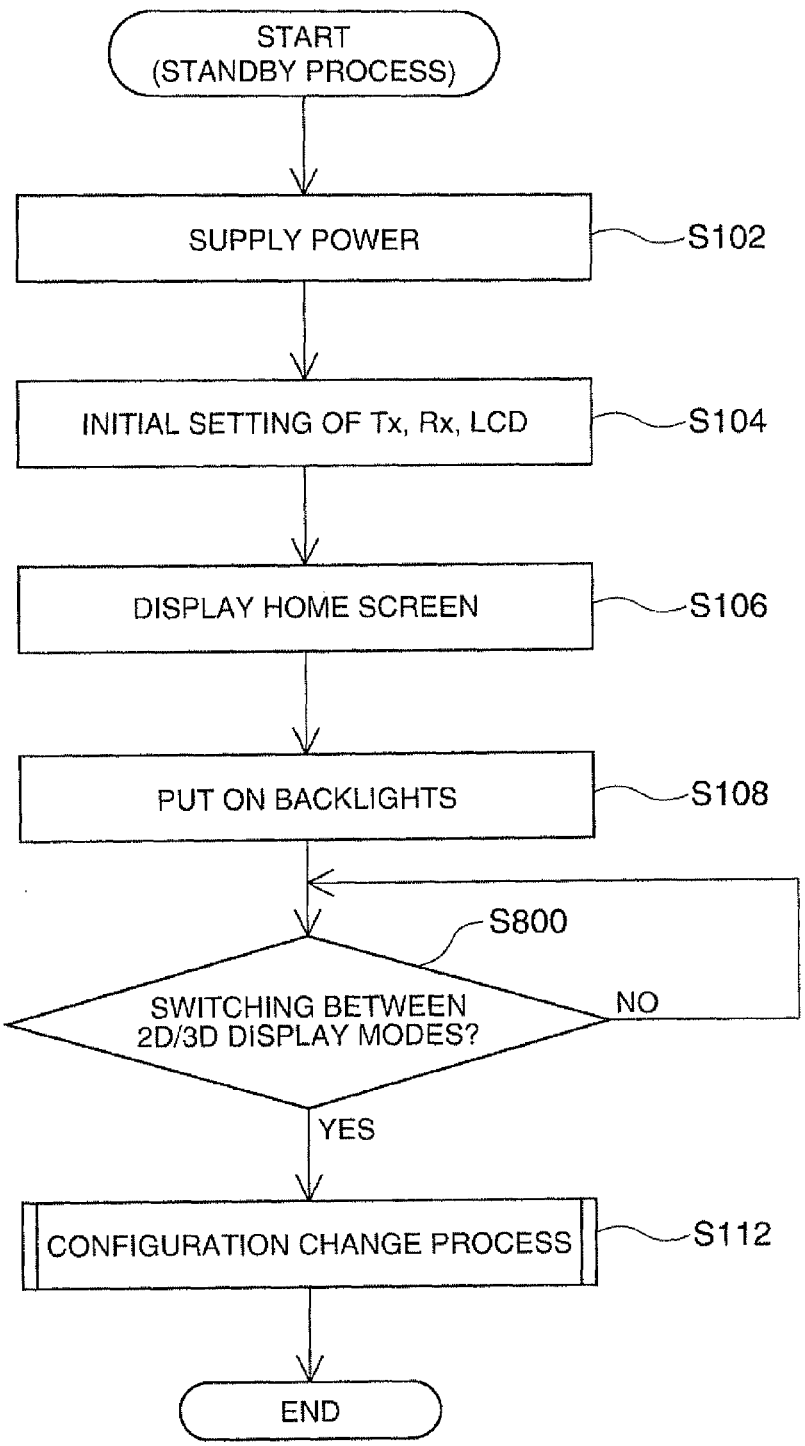
FIG. 18 is a flowchart showing a procedure of the standby process in a sixth embodiment of the invention.

FIG. 18 is a flowchart showing a procedure of the standby process in the sixth embodiment. The only difference from the first embodiment shown in FIG. 5 is the point that the step S800 is provided instead of the step S110, and the other operations are the same as those of the first embodiment.

After displaying the home screen via the process of the steps S106, S108 shown in FIG. 18, the display control section 190 of the control section 10 determines (step S800) whether or not switching between the 2D/3D display modes is detected. If the switching between the 2D/3D display modes is not detected (NO in the step S800), the display control section 190 makes the process make a transition to the step S800 to thereby wait for the switching between the display modes to be detected. In contrast, if the switching between the 2D/3D display modes is detected (YES in the step S800), the display control section 190 performs (step S112) the configuration change process.

F-3. Configuration Change Process

The procedure of the configuration change process in the sixth embodiment is the same as that in the first embodiment shown in FIG. 6.

As described above, according to the sixth embodiment, since the control section 10 controls the luminance of the pair of image light generation sections so as to degrade the visibility of the virtual image VI for a predetermined period of time in the case in which the disturbance in the data communication between the transmitting sections and the receiving sections is presumed, namely in the case in which the image data to be transmitted to one (e.g., the right LCD control section 211) of the pair of image light generation sections and the image data to be transmitted to the other (e.g., the left LCD control section 212) thereof are made different from each other (in other words, in the case of setting the 3D display mode for making the user visually recognize the three-dimensional virtual image VI), it is possible to realize the configuration with which it is difficult for the user to be aware of the disturbance in the image even in the case in which the disturbance in the image occurs due to the switching to the 3D display mode.

G. Modified Examples

It should be noted that the invention is not limited to the specific examples and the embodiments described above, but can take a variety of configurations within the scope of the invention. For example, the functions realized by the software can also be arranged to be realized by hardware. Besides the above, the following modifications are possible.

G1. Modified Example 1

In the embodiments described above, the configuration of the head mount display is exemplified. However, the configuration of the head mount display can arbitrarily be determined within the scope of the invention, and addition, elimination, replacement, and so on of each of the constituents can be conducted.

In the embodiments described above, it is assumed that the control section is provided with the transmitting sections 51, 52, and the image display section is provided with the receiving sections 53, 54 for the sake of convenience of explanation. However, each of the transmitting sections 51, 52 and the receiving sections 53, 54 of the embodiments is provided with a function capable of bidirectional communication, and can function as a transmitting and receiving section.

Figure 19:
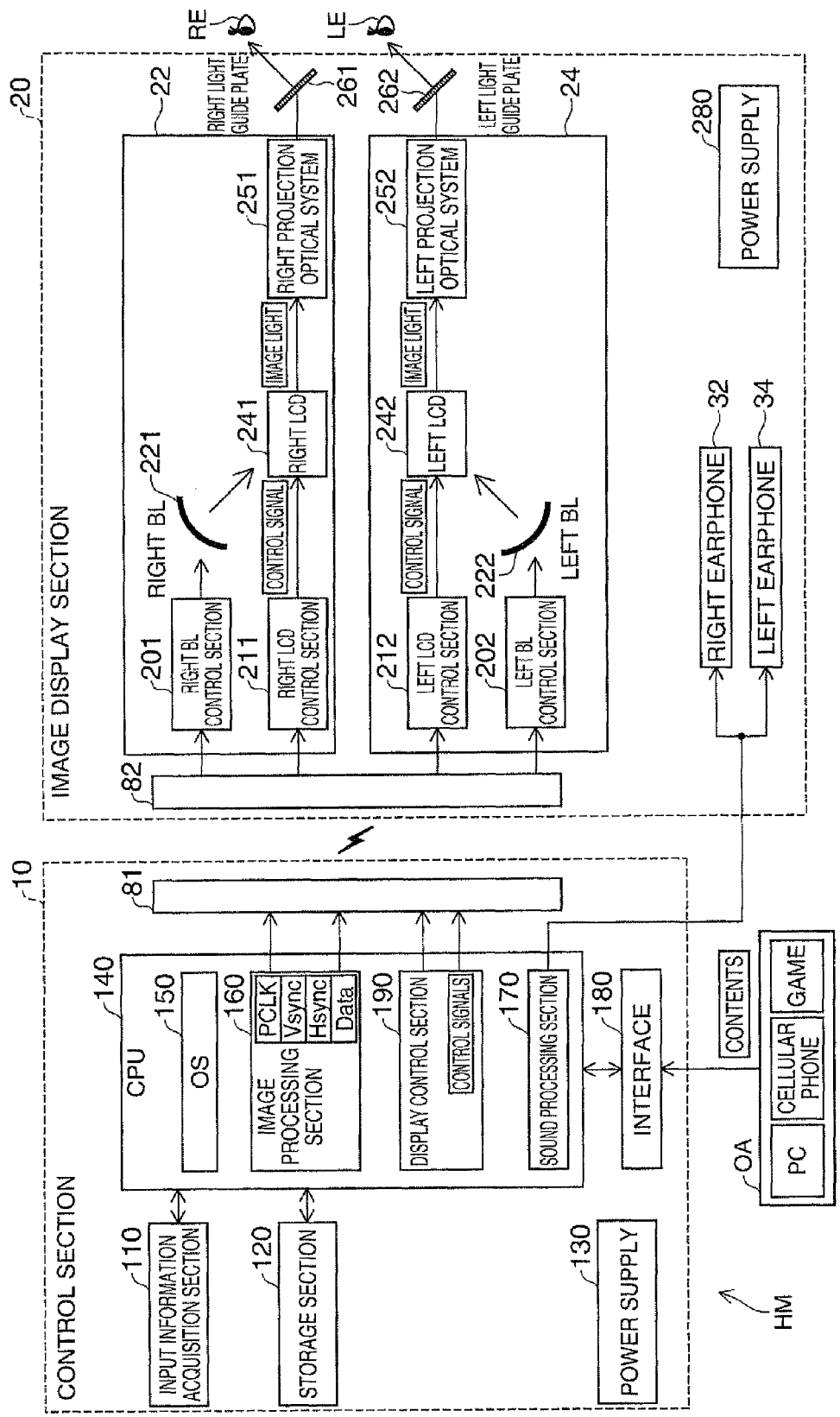
FIG. 19 is a block diagram functionally showing a configuration of the head mount display according to a modified example.

It is also possible to adopt the configuration in which, for example, the connection section is eliminated, and the control section and the image display section can wirelessly communicate with each other as shown in FIG. 19. Specifically, there is adopted the configuration in which the control section is further provided with a wireless communication section 81, and at the same time, the image display section is further provided with a wireless communication section 82 and a power supply 280. In this case, the wireless communication section 81 functions as the transmitting sections 51, 52 in the embodiments described above, and the wireless communication section 82 functions as the receiving sections 53, 54 in the embodiments described above.

For example, the configurations of the control section and the image display section shown in FIG. 1 can arbitrarily be modified. Specifically, it is also possible to adopt the configuration of, for example, eliminating the touch pad from the control section, and operating only with the arrow keys. Further, it is also possible to provide the control section with other operating interfaces such as an operating stick. Further, it is also possible to adopt the configuration capable of connecting devices such as a keyboard or a mouse to the control section to thereby receive an input from the keyboard or the mouse. Further, it is also possible to provide the control section with a communication section using Wireless Fidelity (Wi-Fi) or the like.

For example, it is assumed that the control section shown in FIG. 1 is connected to the image display section via the wired signal transmission path. However, it is also possible for the control section and the image display section to be connected to each other with the connection via wireless signal transmission path such as a wireless LAN, infrared communication, or Bluetooth (registered trademark).

For example, although it is assumed that the head mount display is a binocular transmissive head mount display, it can also be configured as a non-transmissive head mount display with which the background is blocked in the condition in which the user wears the head mount display. Further, it can be arranged as a monocular head mount display.

For example, the functional sections such as the image processing section, the display control section, and the sound processing section are described assuming that these sections are realized by the CPU developing the computer program, which is stored in the ROM or the hard disk, on the RAM, and then executing it. However, it is also possible for these functional sections to be configured using an application specific integrated circuit (ASIC) designed for realizing the functions.

For example, although in the embodiments described above it is assumed that the head mount display has the image display section to be worn like a pair of spectacles, it is also possible to arrange that the image display section is an ordinary planar display device (e.g., a liquid crystal display device, a plasma display device, or an organic EL display device). Also in this case, the connection between the control section and the image display section can be a connection via the wired signal transmission path, or can be a connection via the wireless signal transmission path. According to this configuration, the control section can be used as a remote controller of an ordinary planar display device.

Further, it is also possible to adopt an image display section having other shapes such as an image display section to be worn like a hat as the image display section instead of the image display section to be worn like a pair of spectacles. Further, as the earphones, an ear hook type or a headband type can be adopted, or the earphones can be eliminated.

For example, although in the embodiments described above it is assumed that the secondary battery is used as the power supply, the power supply is not limited to the secondary battery, but a variety of batteries can be used as the power supply. For example, a primary battery, a fuel battery, a solar cell, a thermal battery, and so on can also be used.

G2. Modified Example 2

In the embodiments described above, an example of the standby process of the head mount display is described. However the procedures of the processes shown in FIGS. 5, 11, 14, 15, and 18 are each only an example, and various modifications are possible. It is possible to eliminate some steps or to add other additional steps. Further, the execution sequence of the steps can also be modified.

For example, although it is assumed that the configuration change process shown in FIG. 6 is performed in the step S112 of FIGS. 5, 11, 14, 15, and 18, it is also possible to perform the configuration change process shown in FIG. 9 instead thereof.

For example, in the third embodiment shown in FIG. 11, it is assumed that the image indicating the standby state is displayed in the partial display mode. However, it is also possible to display the image itself in the content in the partial display mode by processing (shrinking or clipping) the image in the content. Further, in the partial display mode, it is possible to reduce the number of colors to be displayed in order to enhance the power saving effect.

For example, in the fourth embodiment shown in FIG. 14, it is assumed that the state check section repeatedly checks the states of the transmitting sections every elapse of a predetermined period of time. However, it is also possible to arrange that the state check section periodically checks the states of the transmitting sections at a longer period, for example, every time the head mount display is started up.

For example, in the fifth embodiment shown in FIG. 15, although the display control section determines that the external device is switched in the case of receiving the display switch request from the reproducing application, the switching between the external devices can be determined by other methods. For example, by identifying the type (an analog signal such as a composite signal, or a digital signal such as an HDMI signal) of the input signal, presence or absence of the switching between the external devices can be determined.

G3. Modified Example 3

In the embodiments described above, an example of the configuration change process of the head mount display is described. However the procedures of the processes shown in FIGS. 6, 9, and 17 are each only an example, and various modifications are possible. It is possible to eliminate some steps or to add other additional steps. Further, the execution sequence of the steps can also be modified.

For example, in the configuration of adopting the organic EL as the image light generation section, it is also possible to set the image data to the solid black dummy data instead of putting on/off the backlights in the steps S202, S210 of the configuration change process shown in FIGS. 6 and 17. By adopting such a configuration, the advantages substantially the same as in the first embodiment can be obtained even in the case of the organic EL having the display elements and the backlight integrated with each other.

For example, although in the configuration change process (steps S302, S304) shown in FIG. 9 it is assumed that the display control section decreases/increases the duty ratio of the PWM signal transmitted to the backlight control sections with time in a stepwise manner, the display control section is not necessarily required to vary the duty ratio in a stepwise manner. For example, it is also possible that the display control section changes the duty ratio of the PWM signal to be transmitted to the backlight control section to a predetermined value (a value lower than a normal value) in the step S302, and then the display control section restores the duty ratio of the PWM signal to the normal value in the step S304 to thereby simply decrease the intensity of the illumination light of the light source during the steps S204 through S208.

For example, in FIG. 9 (steps S302, S304), it is assumed that the intensity of the image light emitted by the image light generation section is controlled by varying the PWM signal to be transmitted to the backlight control section (i.e., by controlling the luminance of the light source) to thereby control the display of the virtual image VI displayed in the visual field VR of the user. However, it is also possible to keep the luminance of the light source in a constant brightness level, and control the transmission of the light in the liquid crystal of the LCD to thereby control the intensity of the image light emitted by the image light generation section, and thus control the display of the virtual image VI displayed in the visual field VR of the user.

G4. Modified Example 4

In the embodiments described above, it is assumed that the image light generation section is configured using the backlight, the backlight control section, the LCD, and the LCD control section. However, the configuration described above is only an example. It is also possible for the image light generation section to be provided with a constituent for realizing another form together with or instead of these constituents.

For example, it is also possible for the image light generation section to have a configuration including an organic EL (organic electroluminescence) display and an organic EL control section. In this case, "controlling the luminance of the image light generation section" in the embodiment described above denotes that the organic EL control section performs the luminance control on the organic EL display to thereby vary the light intensity of the organic EL display. Further, for example, it is also possible to apply the invention to a laser retinal projection head-mount type display device. In this case, "controlling the luminance of the image light generation section" denotes that at least one of the control of the light intensity of the laser beam to be emitted and the reflection angle control in the reflecting mirror and the digital mirror device (DMD) is performed.

The entire disclosure of Japanese Patent Application Nos. 2011-066382, filed Mar. 24, 2011 and 2011-248242, filed Nov. 14, 2011 are expressly incorporated by reference herein.

What is claimed:

1. A head-mount type display device adapted to make a user visually recognize a virtual image, comprising: an image light generation section adapted to generate image light representing an image using image data and then emit the image light; a light guide section adapted to guide the image light, which is emitted, to eyes of the user; a receiving section adapted to receive the image data; and a control section, which is connected to the receiving section, controls image display by the image light generation section, and has a transmitting section adapted to transmit the image data to the receiving section, wherein the control section controls luminance of the image light generation section so as to degrade visibility of the virtual image for a predetermined period of time in a case in which a disturbance in data communication between the transmitting section and the receiving section is presumed, and wherein the control section controls the luminance of the image light generation section so as to degrade the visibility of the virtual image for a predetermined period of time in a case in which a clock rate of the transmitting section is varied in accordance with a variation in a data amount of the image data transmitted between the transmitting section and the receiving section.

2. The head-mount type display device according to claim 1, wherein
the image light generation section further includes a display element adapted to generate the image light from the image data, and
the control section varies the data amount of the image data to be transmitted in order to change at least either one of a display direction of the image generated in the display element, a display size of the image, the number of display colors of the image, and the number of frames per unit time of the image.

3. The head-mount type display device according to claim 1, wherein
the image light generation section further includes a display element adapted to generate the image light from the image data, and
the control section varies the data amount of the image data to be transmitted in order to make the image generated in the display element occupy only a part of a display area of the display element.

4. The head-mount type display device according to claim 1, wherein
the predetermined period of time corresponds to a period in which the control section stops the transmitting section and the receiving section, changes the clock rate in the transmitting section, and then starts up the transmitting section and the receiving section.

5. The head-mount type display device according to claim 1, wherein
the control section stops emitting the image light by controlling the luminance of the image light generation section.

6. A method of controlling a head-mount type display device adapted to make a user visually recognize a virtual image, comprising: (a) generating image light representing an image using image data received from a receiving section, and then emitting the image light; (b) guiding the image light, which is emitted, to eyes of the user; and (c) transmitting the image data using a transmitting section, and controlling image display in (a) and (b) r wherein in (c), luminance of an image light generation section is controlled so as to degrade visibility of the virtual image for a predetermined period of time in a case in which a disturbance in data communication between the transmitting section and the receiving section is presumed, and the luminance of the image light generation section is controlled so as to degrade the visibility of the virtual image for a predetermined period of time in a case in which a clock rate of the transmitting section is varied in accordance with a variation in a data amount of the image data transmitted between the transmitting section and the receiving section.

* * * * *